United States Patent
Zou et al.

(10) Patent No.: US 12,321,870 B2
(45) Date of Patent: Jun. 3, 2025

(54) APPARATUS METHOD AND COMPUTER PROGRAM PRODUCT FOR PROBABILITY MODEL OVERFITTING

(71) Applicant: Nokia Technologies Oy, Espoo (FI)

(72) Inventors: Nannan Zou, Tampere (FI); Francesco Cricrì, Tampere (FI); Honglei Zhang, Tampere (FI); Hamed Rezazadegan Tavakoli, Espoo (FI); Jani Lainema, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 459 days.

(21) Appl. No.: 17/457,136

(22) Filed: Dec. 1, 2021

(65) Prior Publication Data
US 2023/0169372 A1 Jun. 1, 2023

(51) Int. Cl.
*G06N 7/00* (2023.01)
*G06N 7/01* (2023.01)
(Continued)

(52) U.S. Cl.
CPC ............... *G06N 7/01* (2023.01); *G06V 10/44* (2022.01); *G06V 10/467* (2022.01); *G06V 10/84* (2022.01); *H04N 19/176* (2014.11); *H04N 19/61* (2014.11)

(58) Field of Classification Search
CPC .......... G06N 7/01; G06N 3/045; G06N 3/047; G06N 3/08; G06N 3/084; G06N 3/088;
(Continued)

(56) References Cited

U.S. PATENT DOCUMENTS

2019/0311259 A1 10/2019 Cricri et al.
2019/0393903 A1* 12/2019 Mandt ..................... H03M 7/30

FOREIGN PATENT DOCUMENTS

WO 2019/185815 A1 10/2019
WO WO-2019197715 A1 * 10/2019 ........... G06N 3/0454
WO WO-2021220008 A1 * 11/2021 ............. G06N 3/045

OTHER PUBLICATIONS

Zou et al, L2C—Learning to Learn to Compress, IEEE 22nd International Workshop on Multimedia Signal Processing Virtually in Tampere, Finland, Sep. 21-24, 2020.*

(Continued)

*Primary Examiner* — Xiao Liu
(74) *Attorney, Agent, or Firm* — McCarter & English, LLP

(57) ABSTRACT

Various embodiments provide an apparatus, a method, and a computer program product. 1. An apparatus incudes at least one processor; and at least one non-transitory memory includes computer program code; wherein the at least one memory and the computer program code are configured to, with the at least one processor, cause the apparatus at least to: perform an overfitting operation, at an encoder side, to obtain an overfitted probability model, wherein overfitting comprises one or more training operations applied to a probability model, wherein one or more parameters of the probability model are trained; use the overfitted probability model to provide probability estimates to a lossless codec or a substantially lossless codec for encoding data or a portion of the data; and signal information to a decoder on whether to perform the overfitting operation at the decoder side.

24 Claims, 13 Drawing Sheets

(51) Int. Cl.
*G06V 10/44* (2022.01)
*G06V 10/46* (2022.01)
*G06V 10/84* (2022.01)
*H04N 19/176* (2014.01)
*H04N 19/61* (2014.01)

(58) Field of Classification Search
CPC ...... G06V 10/44; G06V 10/467; G06V 10/84; H04N 19/176; H04N 19/61; H04N 19/91
See application file for complete search history.

(56) References Cited

OTHER PUBLICATIONS

Overfitting—Wikipedia (Year: 2024).*
What is Overfitting—IBM (Year: 2024).*
"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Versatile Video Coding", Series H: Audiovisual and Multimedia Systems Infrastructure of audiovisual services—Coding of moving video, Recommendation ITU-T H.266, Aug. 2020, 516 pages.
"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.
Zou et al., "Learning to Learn to Compress", arXiv, May 1, 2021, 6 pages.
Sun et al., "Online Probability Model Estimation For Video Compression", Data Compression Conference (DCC), Mar. 24-27, 2020, pp. 263-272.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2020, 220 pages.
"Information Technology—Coding Of Audio-Visual Objects—Part 12: ISO Base Media File Format", ISO/IEC 14496-12, Fifth edition, Dec. 15, 2015, 248 pages.
"Information technology—Universal coded character set (Ucs)", ISO/IEC 10646, Sixth edition, Dec. 2020, 9 pages.
"Information Technology—Coding Of Audio-Visual Objects—Part 15: Advanced Video Coding (AVC) File Format", ISO/IEC 14496-15, First edition, Apr. 15, 2004, 29 pages.
Ignatov et al., "AI Benchmark: Running Deep Neural Networks on Android Smartphones", arXiv, Oct. 15, 2018, pp. 1-15.
"Information Technology—Dynamic Adaptive Streaming over HTTP (DASH)—Part 1: Media Presentation Description and Segment Formats", ISO/IEC 23009-1, Second Edition, May 15, 2014, 152 pages.

* cited by examiner

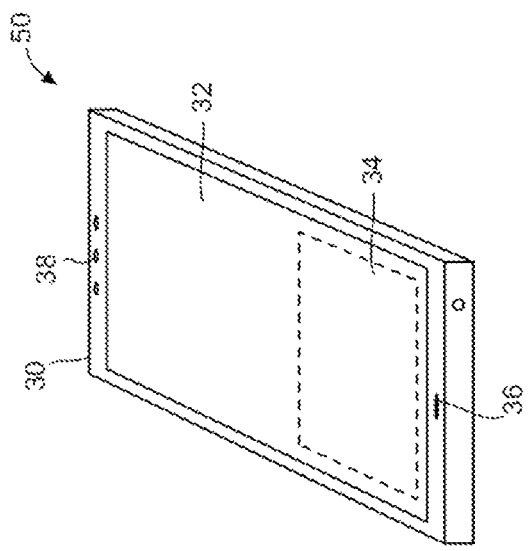
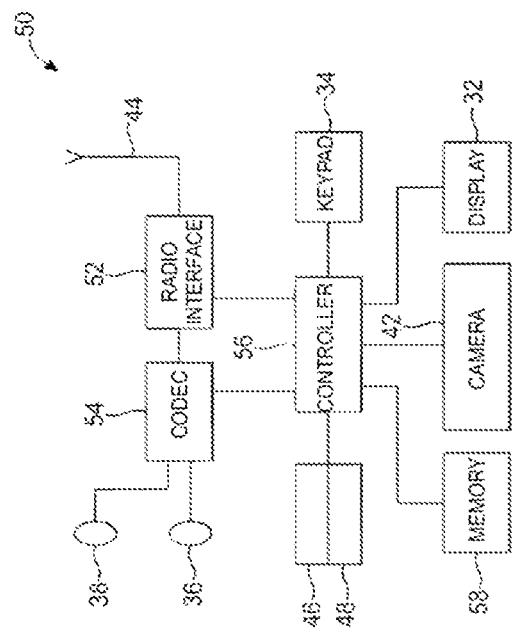

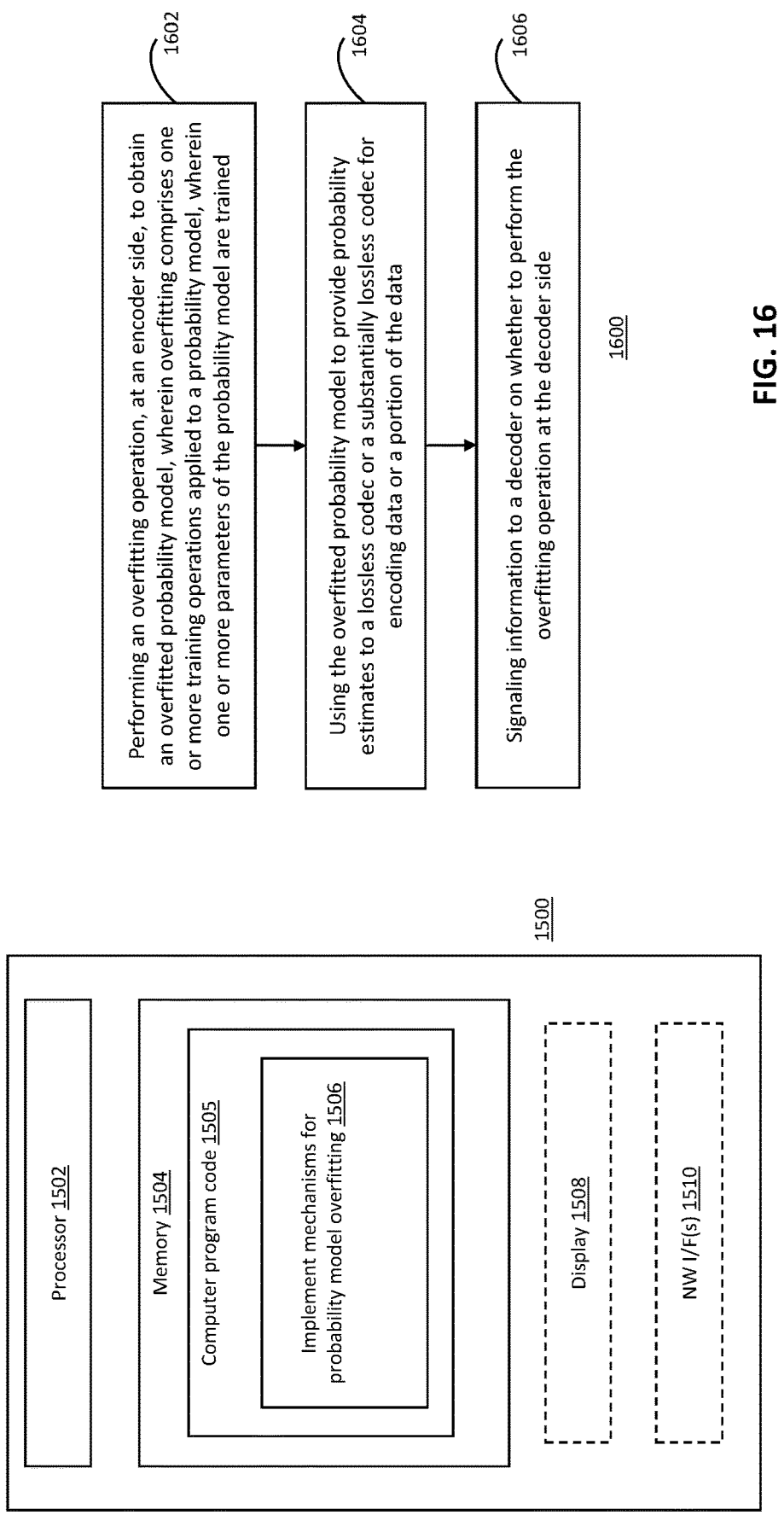

APPARATUS METHOD AND COMPUTER PROGRAM PRODUCT FOR PROBABILITY MODEL OVERFITTING

The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey.

TECHNICAL FIELD

The examples and non-limiting embodiments relate generally to multimedia transport and neural networks, and more particularly, to method, apparatus, and computer program product for probability model overfitting.

BACKGROUND

It is known to provide standardized formats for exchange of neural networks.

SUMMARY

An example apparatus includes at least one processor; and at least one non-transitory memory comprising computer program code; wherein the at least one memory and the computer program code are configured to, with the at least one processor, cause the apparatus at least to: perform an overfitting operation, at an encoder side, to obtain an overfitted probability model, wherein overfitting comprises one or more training operations applied to a probability model, wherein one or more parameters of the probability model are trained; use the overfitted probability model to provide probability estimates to a lossless codec or a substantially lossless codec for encoding data or a portion of the data; and signal information to a decoder on whether to perform the overfitting operation at the decoder side.

The example apparatus may further include, wherein a copy of the probability model is available at the decoder side, and wherein the decoder performs the overfitting operation based on the signal.

The example apparatus may further include, wherein the apparatus is further caused to: perform the overfitting operation on one or more versions of the probability model to obtain the one or more overfitted probability models; compare the performance of probability models among the one or more overfitted probability models and the one or more versions of the probability model; and select, from the one or more overfitted probability models and the one or more versions of the probability models, to obtain a selected probability model with a predetermined performance based on one or more predetermined criteria.

The example apparatus may further include, wherein the information signaled to the decoder further indicates to the decoder details about the overfitting operation; and identifies data that need to be decoded by using probability estimates obtained from the selected probability model.

The example apparatus may further include, wherein an input data is used to overfit the probability model, and wherein the input data is sampled from or comprised in data that was previously encoded by the lossless codec or the substantially lossless codec.

The example apparatus may further include, wherein the input data comprises one or more of the following: one or more previously encoded frames; one or more pixels of a previously encoded frame; one or more pixels of a currently encoded frame; one or more pixels that have been encoded in past predetermined time, wherein the one or more pixels are part of a frame; one or more previously encoded latent tensors or feature tensors; one or more elements of a previously encoded latent tensor or feature tensor; one or more elements of a currently encoded latent tensor or feature tensor; or one or more elements that have been encoded in past predetermined time, wherein the one or more elements are part of a latent tensor or a feature tensor.

The example apparatus may further include, wherein the data, from which the input data is sampled or comprised in, comprises an overfitting media item.

The example apparatus may further include, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the data, from which the input data is sampled or comprised in, comprises an overfitting media item, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the one or more overfitted probability models comprise one or more of default probability models, a latest overfitted probability model, or a previously overfitted probability model.

The example apparatus may further include, wherein the apparatus is further caused to use the one or more overfitted probability models or one or more previously available probability models to encode data that follow the overfitted media item or a portion of the data that follows the overfitted media item in decoding order, wherein data that follow the overfitted media item or a portion of the data that follows the overfitted media item comprises an inference media item.

The example apparatus may further include, wherein the inference media item comprises one or more of the following: a portion of a frame, or features extracted from the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the apparatus is further caused to determine coding gains brought by different probability models for a chosen inference media item; compare the coding gains; and select a probability model for the chosen inference media item based on one or more predetermined criteria.

The example apparatus may further include, wherein the apparatus is further caused to: overfit a default probability model on a previously encoded frame; compare the overfitted default probability model with the default probability model based on the coding gains obtained when using the overfitted default probability model and the default probability model on a current frame; and determine whether the overfitted default probability model or the default probability model provides higher coding gains.

The example apparatus may further include, wherein the apparatus is further caused: overfit a default probability model and a latest overfitted probability model on a previously encoded frame; compare the overfitted default probability model, the overfitted latest overfitted probability model, and the default probability model based on the coding gains obtained when using the overfitted default probability model, the overfitted latest overfitted probability model, and the default probability model on a current frame; and determine whether the overfitted default probability model, the overfitted latest overfitted probability model, or the default probability model provides highest coding gains.

The example apparatus may further include, wherein the predetermined criteria comprises one or more of the following: coding gain, wherein the coding gain comprises a bitrate decrease when the optimal probability model is used to provide the probability estimates to the lossless codec or the substantially lossless codec; or a trade-off between the coding gain and resource complexity of the overfitting operation, wherein the resource complexity comprises computational or memory capabilities of a decoder side device.

The example apparatus may further include, wherein the information signaled to the decoder side further comprises details about one or more of the following: a version of the probability model to be used when the overfitting operation is not be performed; a version of the probability model to be used as a base probability model for performing the overfitting operation; an overfitting media item to be used for performing the overfitting operation, wherein the information further comprises a type of overfitting media item and coordinates to uniquely identify a specific overfitting media item; data to be decoded by using the probability model referred in the signal; or the training, wherein training is part of the overfitting operation, and wherein the details about the training comprise a number of epochs or iterations, a learning rate, an optimizer routine, a loss function, a loss function schedule, a data preprocessing information, any seeds for pseudo-random processes, or any other information which is needed by the decoder to perform the overfitting operation in same or substantially same way as performed by the encoder.

The example apparatus may further include, wherein the information signaled to the decoder side further comprises a first variable used to inform the decoder whether to use an already available probability model or to perform overfitting, and a base probability model to use.

The example apparatus may further include, wherein the first variable comprises one of the following values: '0' to specify using one of the default probability models; '1' to specify using the latest overfitted probability model; '2' to specify using one of the previously overfitted probability models; '3' to specify to overfit one of the default probability models; '4' to specify to overfit the latest overfitted probability model; or '5' to specify to overfit another previously overfitted probability model.

The example apparatus may further include, wherein when value of '0', '2', '3', or '5' is signaled, the information signaled to the decoder side further indicates a version of the probability model to be used or overfitted.

The example apparatus may further include, wherein the information signaled to the decoder side further comprises a second variable used to inform the decoder about data to be decoded by using the indicated probability model, when the second variable is not signaled, the decoder uses an indicated probability model for a default data.

The example apparatus may further include, wherein the second variable comprises one of the following values: '0' to specify to use an indicated probability model for next data to be decoded, until further notice; '1' to specify to use the indicated probability model for a current frame; '2' to specify to use the indicated probability model for a current RA segment; '3' to specify to use the indicated probability model for a current temporal layer; '4' to specify to use the indicated probability model for frames indicated by a first set of variables signaled separately; or '5' to specify to use the indicated probability model for regions and frames indicated by a second set of variables signaled separately.

The example apparatus may further include, wherein when value of '4', or '5' is signaled, the information signaled to the decoder side further indicates frames, or regions and frames to be decoded by using the indicated probability model.

The example apparatus may further include, wherein the information signaled to the decoder side is determined by the encoder side device such that the overfitting operation performed at the decoder side comprises at least one of a low computational or memory complexity.

The example apparatus may further include, wherein the apparatus is further caused to perform the overfitting operation by using data that is not part of a content being encoded.

The example apparatus may further include, wherein the data, that is not part of the content being encoded, comprises an external overfitting media item, and wherein the external overfitting media item comprises one or more of following: a data item, wherein the data item comprises one or more of following: a small image; or a tensor, wherein the tensor is available at the encoder side, or is synthesized during the overfitting operation, and wherein the encoder encodes the external overfitting media item and provides the external overfitting media item to the decoder, and wherein the decoder decodes the external overfitting media item and uses the decoded external overfitting media item during or for the overfitting operation; or an image, a video, or a data tensor available both at the encoder side and the decoder side, as part of a dataset or collection of data items, and wherein the information signaled to the decoder side comprises details on to retrieve the external overfitting media item by using as an index that identifies the external overfitting media item within a collection of data items, or an URI, and wherein the decoder retrieves the external overfitting media item and uses the external overfitting media item during or for the overfitting operation.

The example apparatus may further include, wherein the apparatus is further caused to: determine data to be used as context by the one or more overfitted probability models or the one or more previously available probability models for outputting a probability estimate for a subset of the inference media item; signal information about the determined context data to the decoder side and information about the inference media item that is to be decoded based on the probability estimate for the subset of the inference media item, when an input to the probability model comprises the determined context data; and use the determined context data as input to output a probability estimate for the inference media item.

The example apparatus may further include, wherein the apparatus is further caused to: use a recurrent neural network as an architecture for at least a part of the probability model, wherein the probability model comprises one or more internal states; save the one or more internal state to be referenced later; determine an internal state to be used by the probability model for outputting a probability estimate for a subset of inference media item; and signal information about the determined internal state to the decoder side and information about the inference media item that is to be decoded based on the probability estimate that are output by the probability model by using the determined internal state.

The example apparatus may further include, wherein the information signaled to decoder side further comprises details on how to perform the overfitting operation.

Another example apparatus includes at least one processor; and at least one non-transitory memory includes computer program code; wherein the at least one memory and the computer program code are configured to, with the at least one processor, cause the apparatus at least to perform: receive a signal comprising information for indicating whether to perform an overfitting operation at the decoder side; perform the overfitting operation, based on the signal received, to obtain an overfitted probability model, wherein overfitting comprises one or more training operations applied to a probability model, wherein one or more parameters of the probability model are trained; and use the overfitted probability model to provide probability estimates to a lossless codec or a substantially lossless codec for decoding data or a portion of the data.

The example apparatus may further include, wherein the information further indicates about one or more of the following: a version of the probability model to be used when overfitting operation is not to be performed; a version of the probability model to be used as base probability model for performing the overfitting operation; an overfitting media item to use to perform the overfitting operation; an inference media item to be decoded by using the probability model indicated by the signal; or the training process.

The example apparatus may further include, wherein an input data is used to overfit the probability model, and wherein the input data is sampled from or comprised in data that was previously decoded by the lossless codec or the substantially lossless codec.

The example apparatus may further include, wherein the input data comprises one or more of the following: one or more previously decoded frames; one or more pixels of a previously decoded frame; one or more pixels of a currently decoded frame; one or more pixels that have been decoded in past predetermined time, wherein the one or more pixels are part of a frame; one or more previously decoded latent tensors or feature tensors; one or more elements of a previously decoded latent tensor or feature tensor; one or more elements of a currently decoded latent tensor or feature tensor; or one or more elements that have been decoded in past predetermined time, wherein the one or more elements are part of a latent tensor or a feature tensor.

The example apparatus may further include, wherein the data, from which the input data is sampled from or comprised in, comprises an overfitting media item.

The example apparatus may further include, wherein the overfitting media item comprises previously decoded data, and wherein the previously decoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the data, from which the input data is sampled or comprised in, comprises an overfitting media item, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the one or more overfitted probability models comprise one or more of default probability models, a latest overfitted probability model, or a previously overfitted probability model.

The example apparatus may further include, wherein the apparatus is further caused to use the one or more overfitted probability models or one or more previously available probability models to decode data that follow the overfitted media item or a portion of the data that follows the overfitted media item in decoding order, wherein data that follow the overfitted media item or a portion of the data that follows the overfitted media item comprises an inference media item.

The example apparatus may further include, wherein the inference media item comprises one or more of the following: a portion of a frame, or features extracted from the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the apparatus is further caused to perform the overfitting operation by using data that is not part of a content being decoded.

The example apparatus may further include, wherein the data, that is not part of the content being encoded, comprises an external overfitting media item, and wherein the external overfitting media item comprises one or more of following: a data item, wherein the data item comprises one or more of following: a small image; or a tensor, wherein the tensor is available at the encoder side, or is synthesized during the overfitting operation, and wherein the encoder encodes the external overfitting media item and provides the external overfitting media item to the decoder, and wherein the decoder decodes the external overfitting media item and use the decoded external overfitting media item during or for the overfitting operation; or an image, a video, or a data tensor available both at the encoder side and the decoder side, as part of a dataset or collection of data items, and wherein the information comprises details on to retrieve the external overfitting media item by using as an index that identifies the external overfitting media item within a collection of data items, or an URI, and wherein the decoder retrieves the external overfitting media item and uses the external overfitting media item during or for the overfitting operation.

The example apparatus may further include, wherein the apparatus is further caused to: receive information about a determined context data at the decoder side and information about the inference media item that is to be decoded based on the probability estimate for the subset of the inference media item, when an input to the probability model comprises the determined context data, and wherein data to be used as context by the probability model for outputting a probability estimate for a subset of the inference media item is determined at the encoder side; and use the determined context data as input to output a probability estimate for the inference media item.

The example apparatus may further include, wherein the apparatus is further caused to: use a recurrent neural network as an architecture for at least a part of the probability model, wherein the probability model comprises one or more internal states; save the one or more internal state to be referenced later; determine an internal state to be used by the probability model for outputting a probability estimate for a subset of inference media item; and signal information about the determined internal state to the decoder side and information about the inference media item that is to be decoded based on the probability estimate that are output by the probability model by using the determined internal state.

The example apparatus may further include, wherein the information further comprises details on how to perform the overfitting operation.

An example method includes: performing an overfitting operation, at an encoder side, to obtain an overfitted probability model, wherein overfitting comprises one or more training operations applied to a probability model, wherein one or more parameters of the probability model are trained; using the overfitted probability model to provide probability estimates to a lossless codec or a substantially lossless codec for encoding data or a portion of the data; and signaling information to a decoder on whether to perform the overfitting operation at the decoder side.

The example method may further include, wherein a copy of the probability model is available at the decoder side, and wherein the decoder performs the overfitting operation based on the signal.

The example method may further include performing the overfitting operation on one or more versions of the probability model to obtain the one or more overfitted probability models; comparing the performance of probability models among the one or more overfitted probability models and the one or more versions of the probability model; and selecting, from the one or more overfitted probability models and the one or more versions of the probability models, to obtain a selected probability model with a predetermined performance based on one or more predetermined criteria.

The example method may further include, wherein the information signaled to the decoder further indicates to the decoder details about the overfitting operation; and identifies data that need to be decoded by using probability estimates obtained from the selected probability model.

The example method may further include, wherein an input data is used to overfit the probability model, and wherein the input data is sampled from or comprised in data that was previously encoded by the lossless codec or the substantially lossless codec.

The example method may further include, wherein the input data comprises one or more of the following: one or more previously encoded frames; one or more pixels of a previously encoded frame; one or more pixels of a currently encoded frame; one or more pixels that have been encoded in past predetermined time, wherein the one or more pixels are part of a frame; one or more previously encoded latent tensors or feature tensors; one or more elements of a previously encoded latent tensor or feature tensor; one or more elements of a currently encoded latent tensor or feature tensor; or one or more elements that have been encoded in past predetermined time, wherein the one or more elements are part of a latent tensor or a feature tensor.

The example method may further include, wherein the data, from which the input data is sampled or comprised in, comprises an overfitting media item.

The example method may further include, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example method may further include, wherein the data, from which the input data is sampled or comprised in, comprises an overfitting media item, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example method may further include, wherein the one or more overfitted probability models comprise one or more of default probability models, a latest overfitted probability model, or a previously overfitted probability model.

The example method may further include using the one or more overfitted probability models or one or more previously available probability models to encode data that follow the overfitted media item or a portion of the data that follows the overfitted media item in decoding order, wherein data that follow the overfitted media item or a portion of the data that follows the overfitted media item comprises an inference media item.

The example method may further include, wherein the inference media item comprises one or more of the following: a portion of a frame, or features extracted from the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example method may further include determining coding gains brought by different probability models for a chosen inference media item; comparing the coding gains; and selecting a probability model for the chosen inference media item based on one or more predetermined criteria.

The example method may further include overfitting a default probability model on a previously encoded frame; comparing the overfitted default probability model with the default probability model based on the coding gains obtained when using the overfitted default probability model and the default probability model on a current frame; and determining whether the overfitted default probability model or the default probability model provides higher coding gains.

The example method may further include overfitting a default probability model and a latest overfitted probability model on a previously encoded frame; comparing the overfitted default probability model, the overfitted latest overfitted probability model, and the default probability model based on the coding gains obtained when using the overfitted default probability model, the overfitted latest overfitted probability model, and the default probability model on a current frame; and determining whether the overfitted default probability model, the overfitted latest overfitted probability model, or the default probability model provides highest coding gains.

The example method may further include, wherein the predetermined criteria comprises one or more of the following: coding gain, wherein the coding gain comprises a bitrate decrease when the optimal probability model is used to provide the probability estimates to the lossless codec or the substantially lossless codec; or a trade-off between the coding gain and resource complexity of the overfitting operation, wherein the resource complexity comprises computational or memory capabilities of a decoder side device.

The example method may further include, wherein the information signaled to the decoder side further comprises details about one or more of the following: a version of the probability model to be used when the overfitting operation is not be performed; a version of the probability model to be used as a base probability model for performing the overfitting operation; an overfitting media item to be used for performing the overfitting operation, wherein the information further comprises a type of overfitting media item and coordinates to uniquely identify a specific overfitting media item; data to be decoded by using the probability model referred in the signal; or the training, wherein training is part of the overfitting operation, and wherein the details about the training comprise a number of epochs or iterations, a learning rate, an optimizer routine, a loss function, a loss function schedule, a data preprocessing information, any seeds for pseudo-random processes, or any other information which is needed by the decoder to perform the overfitting operation in same or substantially same way as performed by the encoder.

The example method may further include, wherein the information signaled to the decoder side further comprises a first variable used to inform the decoder whether to use an already available probability model or to perform overfitting, and a base probability model to use.

The example method may further include, wherein the first variable comprises one of the following values: '0' to specify using one of the default probability models; '1' to specify using the latest overfitted probability model; '2' to specify using one of the previously overfitted probability models; '3' to specify to overfit one of the default probability models; '4' to specify to overfit the latest overfitted probability model; or '5' to specify to overfit another previously overfitted probability model.

The example method may further include, wherein when value of '0', '2', '3', or '5' is signaled, the information signaled to the decoder side further indicates a version of the probability model to be used or overfitted.

The example method may further include, wherein the information signaled to the decoder side further comprises a second variable used to inform the decoder about data to be decoded by using the indicated probability model, when the second variable is not signaled, the decoder uses an indicated probability model for a default data.

The example method may further include, wherein the second variable comprises one of the following values: '0' to specify to use an indicated probability model for next data to be decoded, until further notice; '1' to specify to use the indicated probability model for a current frame; '2' to specify to use the indicated probability model for a current RA segment; '3' to specify to use the indicated probability model for a current temporal layer; '4' to specify to use the indicated probability model for frames indicated by a first set of variables signaled separately; or '5' to specify to use the indicated probability model for regions and frames indicated by a second set of variables signaled separately.

The example method may further include, wherein when value of '4', or '5' is signaled, the information signaled to the decoder side further indicates frames, or regions and frames to be decoded by using the indicated probability model.

The example method may further include, wherein the information signaled to the decoder side is determined by the encoder side device such that the overfitting operation performed at the decoder side comprises at least one of a low computational or memory complexity.

The example method may further include performing the overfitting operation by using data that is not part of a content being encoded.

The example method may further include, wherein the data, that is not part of the content being encoded, comprises an external overfitting media item, and wherein the external overfitting media item comprises one or more of following: a data item, wherein the data item comprises one or more of following: a small image; or a tensor, wherein the tensor is available at the encoder side, or is synthesized during the overfitting operation, and wherein the encoder encodes the external overfitting media item and provides the external overfitting media item to the decoder, and wherein the decoder decodes the external overfitting media item and uses the decoded external overfitting media item during or for the overfitting operation; or an image, a video, or a data tensor available both at the encoder side and the decoder side, as part of a dataset or collection of data items, and wherein the information signaled to the decoder side comprises details on to retrieve the external overfitting media item by using as an index that identifies the external overfitting media item within a collection of data items, or an URI, and wherein the decoder retrieves the external overfitting media item and uses the external overfitting media item during or for the overfitting operation.

The example method may further include determining data to be used as context by the one or more overfitted probability models or the one or more previously available probability models for outputting a probability estimate for a subset of the inference media item; signaling information about the determined context data to the decoder side and information about the inference media item that is to be decoded based on the probability estimate for the subset of the inference media item, wherein when an input to the probability model comprises the determined context data; and using the determined context data as input to output a probability estimate for the inference media item.

The example method may further include using a recurrent neural network as an architecture for at least a part of the probability model, wherein the probability model comprises one or more internal states; saving the one or more internal state to be referenced later; determining an internal state to be used by the probability model for outputting a probability estimate for a subset of inference media item; and signaling information about the determined internal state to the decoder side and information about the inference media item that is to be decoded based on the probability estimate that are output by the probability model by using the determined internal state.

The example method may further include, wherein the information signaled to decoder side further comprises details on how to perform the overfitting operation.

Another example method includes receiving a signal comprising information for indicating whether to perform an overfitting operation at the decoder side; performing the overfitting operation, based on the signal received, to obtain an overfitted probability model, wherein overfitting comprises one or more training operations applied to a probability model, wherein one or more parameters of the probability model are trained; and using the overfitted probability model to provide probability estimates to a lossless codec or a substantially lossless codec for decoding data or a portion of the data.

The example method may further include, wherein the information further indicates about one or more of the following: a version of the probability model to be used when overfitting operation is not to be performed; a version of the probability model to be used as base probability model for performing the overfitting operation; an overfitting media item to use to perform the overfitting operation; an inference media item to be decoded by using the probability model indicated by the signal; or the training process.

The example method may further include, wherein an input data is used to overfit the probability model, and wherein the input data is sampled from or comprised in data that was previously decoded by the lossless codec or the substantially lossless codec.

The example method may further include, wherein the input data comprises one or more of the following: one or more previously decoded frames; one or more pixels of a previously decoded frame; one or more pixels of a currently decoded frame; one or more pixels that have been decoded in past predetermined time, wherein the one or more pixels are part of a frame; one or more previously decoded latent tensors or feature tensors; one or more elements of a previously decoded latent tensor or feature tensor; one or more elements of a currently decoded latent tensor or feature tensor; or one or more elements that have been decoded in past predetermined time, wherein the one or more elements are part of a latent tensor or a feature tensor.

The example method may further include, wherein the data, from which the input data is sampled from or comprised in, comprises an overfitting media item.

The example method may further include, wherein the overfitting media item comprises previously decoded data, and wherein the previously decoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example apparatus may further include, wherein the data, from which the input data is sampled or comprised in, comprises an overfitting media item, wherein the overfitting media item comprises previously encoded data, and wherein the previously encoded data comprises one or more of following: a portion of a frame, or features extracted from the frame; a downsampled version of the frame, or features extracted from the downsampled version of the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example method may further include, wherein the one or more overfitted probability models comprise one or more of default probability models, a latest overfitted probability model, or a previously overfitted probability model.

The example method may further include using the one or more overfitted probability models or one or more previously available probability models to decode data that follow the overfitted media item or a portion of the data that follows the overfitted media item in decoding order, wherein data that follow the overfitted media item or a portion of the data that follows the overfitted media item comprises an inference media item.

The example method may further include, wherein the inference media item comprises one or more of the following: a portion of a frame, or features extracted from the frame; set of portions of the frame, or features extracted from the set of portions of the frame; a set of portions of a set of frames, or features extracted from the set of portions of the set of frames; a frame of a video, or features extracted from the frame of the video; a set of frames of the video or features extracted from the set of frames of the video; or a set of videos, or features extracted from the set of videos.

The example method may further include performing the overfitting operation by using data that is not part of a content being decoded.

The example method may further include, wherein the data, that is not part of the content being encoded, comprises an external overfitting media item, and wherein the external overfitting media item comprises one or more of following: a data item, wherein the data item comprises one or more of following: a small image; or a tensor, wherein the tensor is available at the encoder side, or is synthesized during the overfitting operation, and wherein the encoder encodes the external overfitting media item and provides the external overfitting media item to the decoder, and wherein the decoder decodes the external overfitting media item and use the decoded external overfitting media item during or for the overfitting operation; or an image, a video, or a data tensor available both at the encoder side and the decoder side, as part of a dataset or collection of data items, and wherein the information comprises details on to retrieve the external overfitting media item by using as an index that identifies the external overfitting media item within a collection of data items, or an URI, and wherein the decoder retrieves the external overfitting media item and uses the external overfitting media item during or for the overfitting operation.

The example method may further include: receiving information about a determined context data at the decoder side and information about the inference media item that is to be decoded based on the probability estimate for the subset of the inference media item, wherein when an input to the probability model comprises the determined context data, and wherein data to be used as context by the probability model for outputting a probability estimate for a subset of the inference media item is determined at the encoder side; and using the determined context data as input to output a probability estimate for the inference media item.

The example method may further include using a recurrent neural network as an architecture for at least a part of the probability model, wherein the probability model comprises one or more internal states; saving the one or more internal state to be referenced later; determining an internal state to be used by the probability model for outputting a probability estimate for a subset of inference media item; and signaling information about the determined internal state to the decoder side and information about the inference media item that is to be decoded based on the probability estimate that are output by the probability model by using the determined internal state.

The example method may further include, wherein the information further comprises details on how to perform the overfitting operation.

An example computer readable medium includes program instructions for causing an apparatus to perform at least the following: perform an overfitting operation, at an encoder side, to obtain an overfitted probability model, wherein overfitting comprises one or more training operations applied to a probability model, wherein one or more parameters of the probability model are trained; use the overfitted probability model to provide probability estimates to a lossless codec or a substantially lossless codec for encoding data or a portion of the data; and signal information to a decoder on whether to perform the overfitting operation at the decoder side.

The example computer readable medium may further include, wherein the apparatus is further caused to perform the methods as described in one or more of the previous paragraphs.

The example computer readable medium may further include, wherein the computer readable medium comprises a non-transitory computer readable medium.

Another example computer readable medium includes program instructions for causing an apparatus to perform at least the following: receive a signal comprising information for indicating whether to perform an overfitting operation at the decoder side; perform the overfitting operation, based on the signal received, to obtain an overfitted probability model, wherein overfitting comprises one or more training operations applied to a probability model, wherein one or more parameters of the probability model are trained; and use the overfitted probability model to provide probability estimates to a lossless codec or a substantially lossless codec for decoding data or a portion of the data.

The example computer readable medium may further include, wherein the apparatus is further caused to perform the methods as described in one or more of the previous paragraphs.

The example computer readable medium may further include, wherein the computer readable medium comprises a non-transitory computer readable medium.

BRIEF DESCRIPTION OF THE DRAWINGS

The foregoing aspects and other features are explained in the following description, taken in connection with the accompanying drawings, wherein:

FIG. 1 shows schematically an electronic device employing embodiments of the examples described herein.

FIG. 2 shows schematically a user equipment suitable for employing embodiments of the examples described herein.

FIG. 15 is an example apparatus, which may be implemented in hardware, and is configured to implement mechanisms for probability model overfitting, based on the examples described herein.

FIG. 16 illustrates an example method for probability model overfitting, in accordance with an embodiment.

DETAILED DESCRIPTION OF EXAMPLE EMBODIMENTS

Figure 3:
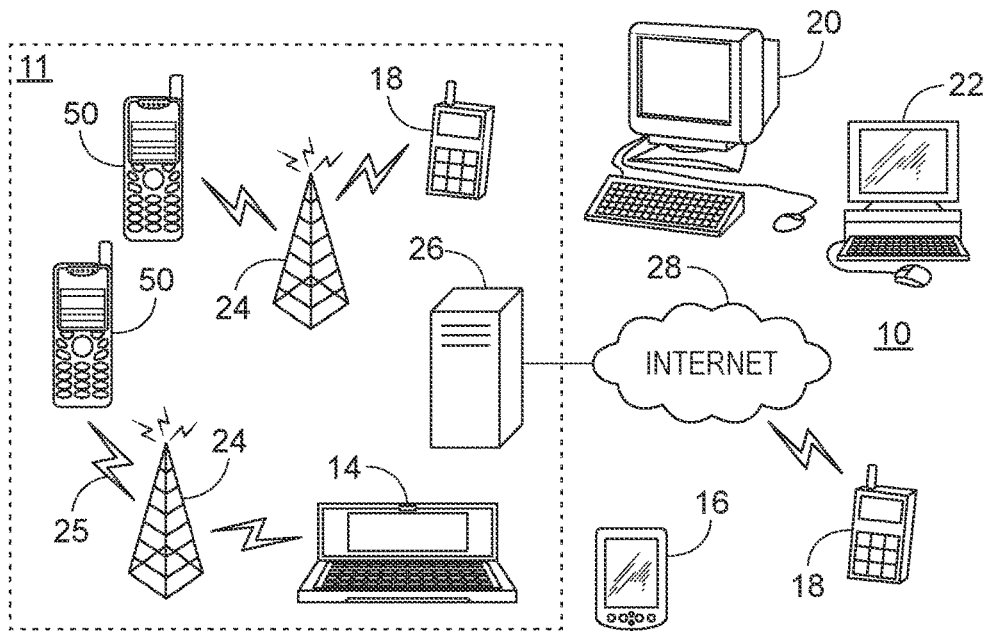
FIG. 3 further shows schematically electronic devices employing embodiments of the examples described herein connected using wireless and wired network connections.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AGT approximated ground truth data
AI artificial intelligence
AIoT AI-enabled IoT
ALF adaptive loop filtering a.k.a. also known as
AMF access and mobility management function
APS adaptation parameter set
AVC advanced video coding
bpp bits-per-pixel
CABAC context-adaptive binary arithmetic coding
CDMA code-division multiple access
CE core experiment
ctu coding tree unit
CU central unit
DASH dynamic adaptive streaming over HTTP
DCT discrete cosine transform
DSP digital signal processor
DSNN decoder-side NN
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
FDC finetuning-driving content
gNB (or gNodeB) base station for 5G/NR, for example, a node providing NR user plane and control plane protocol terminations towards the UE, and connected via the NG interface to the 5GC
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
HQ high-quality
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
IRAP intra random access point
ISO International Organization for Standardization
ISOBMFF ISO base media file format
ITU International Telecommunication Union
ITU-T ITU Telecommunication Standardization Sector
JPEG joint photographic experts group
LMCS luma mapping with chroma scaling
LPNN loss proxy NN
LQ low-quality
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PNG portable network graphics
PSNR peak signal-to-noise ratio
RAM random access memory
RAN radio access network
RBSP raw byte sequence payload
RD loss rate distortion loss
RFC request for comments
RFID radio frequency identification
RLC radio link control
RRC radio resource control
RRH remote radio head
RU radio unit
Rx receiver
SDAP service data adaptation protocol
SGD Stochastic Gradient Descent
SGW serving gateway
SMF session management function
SMS short messaging service
SPS sequence parameter set
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TUC technology under consideration
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VPS video parameter set
WLAN wireless local area network X2 interconnecting interface between two eNodeBs in LTE network Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with example embodiments for implementing mechanisms for probability model overfitting.

In an example, the following describes in detail suitable apparatus and possible mechanisms for probability model overfitting. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display media or multimedia content, for example, an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form, or into a form that is suitable as an input to one or more algorithms for analysis or processing. A video encoder and/or a video decoder may also be separate from each other, for example, need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or 'block') are predicted for example by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
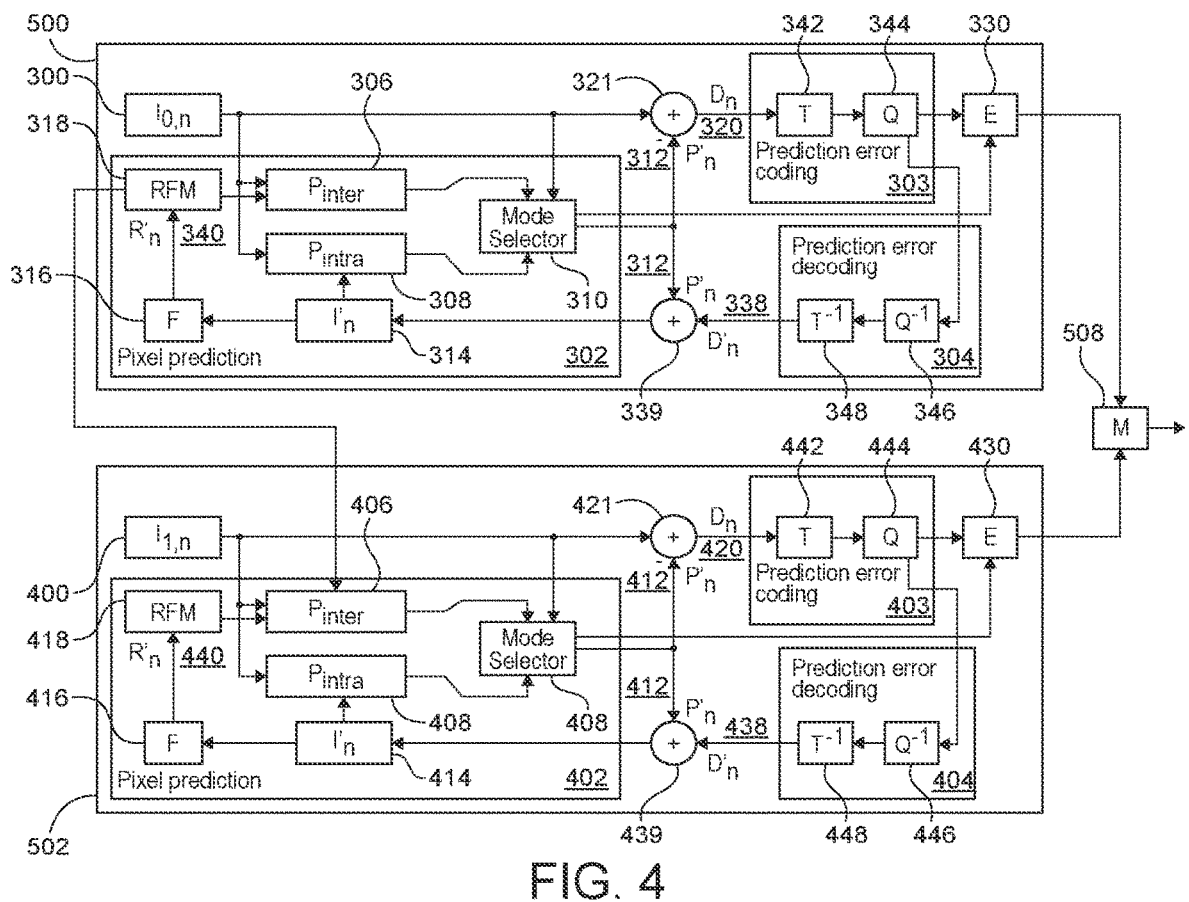
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer picture(s)/image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture(s) 300. Correspondingly, the pixel predictor 402 of the second encoder section 502 receives enhancement layer picture(s)/images(s) of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer pictures 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture(s) 300/enhancement layer picture(s) 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to the filter 316, 416. The filter 316, 416 receiving the preliminary representation may filter the preliminary representation and output a final reconstructed image 340, 440 which may be saved in the reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer picture(s) 400 is compared in inter-prediction operations. Moreover, the reference frame memory 418 may be connected to the inter-predictor 406 to be used as the reference image against which the future enhancement layer picture(s) 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide a compressed signal. The outputs of the entropy encoders 330, 430 may be inserted into a bitstream, for example, by a multiplexer 508.

Figure 5:
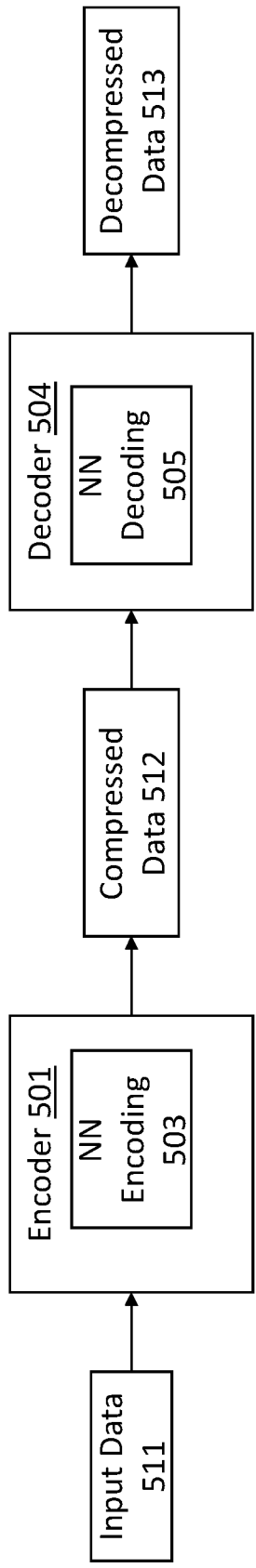
FIG. 5 is a block diagram showing the interface between an encoder and a decoder in accordance with the examples described herein.

FIG. 5 is a block diagram showing the interface between an encoder 501 implementing neural network based encoding 503, and a decoder 504 implementing neural network based decoding 505 in accordance with the examples described herein. The encoder 501 may embody a device, software method or hardware circuit. The encoder 501 has the goal of compressing input data 511 (for example, an input video) to compressed data 512 (for example, a bitstream) such that the bitrate measuring the size of compressed data 512 is minimized, and the accuracy of an analysis or processing algorithm is maximized. To this end, the encoder 501 uses an encoder or compression algorithm, for example to perform neural network based encoding 503, e.g., encoding the input data by using one or more neural networks.

The general analysis or processing algorithm may be part of the decoder 504. The decoder 504 uses a decoder or decompression algorithm, for example to perform the neural network based decoding 505 (e.g., decoding by using one or more neural networks) to decode the compressed data 512 (for example, compressed video) which was encoded by the encoder 501. The decoder 504 produces decompressed data 513 (for example, reconstructed data).

The encoder 501 and decoder 504 may be entities implementing an abstraction, may be separate entities or the same entities, or may be part of the same physical device.

An out-of-band transmission, signaling, or storage may refer to the capability of transmitting, signaling, or storing information in a manner that associates the information with a video bitstream. The out-of-band transmission may use a more reliable transmission mechanism compared to the protocols used for carrying coded video data, such as slices. The out-of-band transmission, signaling or storage can additionally or alternatively be used e.g. for ease of access or session negotiation. For example, a sample entry of a track in a file conforming to the ISO Base Media File Format may comprise parameter sets, while the coded data in the bitstream is stored elsewhere in the file or in another file. Another example of out-of-band transmission, signaling, or storage comprises including information, such as NN and/or NN updates in a file format track that is separate from track(s) containing coded video data.

The phrase along the bitstream (e.g. indicating along the bitstream) or along a coded unit of a bitstream (e.g. indicating along a coded tile) may be used in claims and described embodiments to refer to transmission, signaling, or storage in a manner that the 'out-of-band' data is associated with, but not included within, the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream. In another example, the phrase along the bitstream may be used when the bitstream is made available as a stream over a communication protocol and a media description, such as a streaming manifest, is provided to describe the stream.

An elementary unit for the output of a video encoder and the input of a video decoder, respectively, may be a network abstraction layer (NAL) unit. For transport over packet-oriented networks or storage into structured files, NAL units may be encapsulated into packets or similar structures. A bytestream format encapsulating NAL units may be used for transmission or storage environments that do not provide framing structures. The bytestream format may separate NAL units from each other by attaching a start code in front of each NAL unit. To avoid false detection of NAL unit boundaries, encoders may run a byte-oriented start code emulation prevention algorithm, which may add an emulation prevention byte to the NAL unit payload if a start code would have occurred otherwise. In order to enable straight-forward gateway operation between packet and stream-oriented systems, start code emulation prevention may be performed regardless of whether the bytestream format is in use or not. A NAL unit may be defined as a syntax structure containing an indication of the type of data to follow and bytes containing that data in the form of a raw byte sequence payload interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

In some coding standards, NAL units consist of a header and payload. The NAL unit header indicates the type of the NAL unit. In some coding standards, the NAL unit header indicates a scalability layer identifier (e.g. called nuh_layer_id in H.265/HEVC and H.266/VVC), which could be used e.g. for indicating spatial or quality layers, views of a multiview video, or auxiliary layers (such as depth maps or alpha planes). In some coding standards, the NAL unit header includes a temporal sublayer identifier, which may be used for indicating temporal subsets of the bitstream, such as a 30-frames-per-second subset of a 60-frames-per-second bitstream.

NAL units may be categorized into Video Coding Layer (VCL) NAL units and non-VCL NAL units. VCL NAL units are typically coded slice NAL units.

A non-VCL NAL unit may be, for example, one of the following types: a video parameter set (VPS), a sequence parameter set (SPS), a picture parameter set (PPS), an adaptation parameter set (APS), a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure, for example, using an identifier.

Some types of parameter sets are briefly described in the following, but it needs to be understood, that other types of parameter sets may exist and that embodiments may be applied, but are not limited to, the described types of parameter sets.

Parameters that remain unchanged through a coded video sequence may be included in a sequence parameter set. Alternatively, an SPS may be limited to apply to a layer that references the SPS, e.g. an SPS may remain valid for a coded layer video sequence. In addition to the parameters that may be needed by the decoding process, the sequence parameter set may optionally contain video usability information (VUI), which includes parameters that may be important for buffering, picture output timing, rendering, and resource reservation.

A picture parameter set contains such parameters that are likely to be unchanged in several coded pictures. A picture parameter set may include parameters that can be referred to by the VCL NAL units of one or more coded pictures.

A video parameter set (VPS) may be defined as a syntax structure containing syntax elements that apply to zero or more entire coded video sequences and may contain parameters applying to multiple layers. The VPS may provide information about the dependency relationships of the layers in a bitstream, as well as many other information that are applicable to all slices across all layers in the entire coded video sequence.

A video parameter set RBSP may include parameters that can be referred to by one or more sequence parameter set RBSPs.

The relationship and hierarchy between a video parameter set (VPS), a sequence parameter set (SPS), and a picture parameter set (PPS) may be described as follows. A VPS resides one level above an SPS in the parameter set hierarchy and in the context of scalability. The VPS may include parameters that are common for all slices across all layers in the entire coded video sequence. The SPS includes the parameters that are common for all slices in a particular layer in the entire coded video sequence, and may be shared by multiple layers. The PPS includes the parameters that are common for all slices in a particular picture and are likely to be shared by all slices in multiple pictures.

An adaptation parameter set (APS) may be specified in some coding formats, such as H.266/VVC. An APS may be applied to one or more image segments, such as slices. In H.266/VVC, an APS may be defined as a syntax structure containing syntax elements that apply to zero or more slices as determined by zero or more syntax elements found in slice headers or in a picture header. An APS may comprise a type (aps_params_type in H.266/VVC) and an identifier (aps_adaptation_parameter_set_id in H.266/VVC). The combination of an APS type and an APS identifier may be used to identify a particular APS. H.266/VVC comprises three APS types: an adaptive loop filtering (ALF), a luma mapping with chroma scaling (LMCS), and a scaling list APS types. The ALF APS(s) are referenced from a slice header (thus, the referenced ALF APSs can change slice by slice), and the LMCS and scaling list APS(s) are referenced from a picture header (thus, the referenced LMCS and scaling list APSs can change picture by picture). In H.266/VVC, the APS RBSP has the following syntax:

|  | Descriptor |
|---|---|
| adaptation_parameter_set_rbsp( ) { |  |
|   aps_params_type | u(3) |
|   aps_adaptation_parameter_set_id | u(5) |
|   aps_chroma_present_flag | u(1) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

Video coding specifications may enable the use of supplemental enhancement information (SEI) messages or alike. Some video coding specifications include SEI NAL units, and some video coding specifications contain both prefix SEI NAL units and suffix SEI NAL units. A prefix SEI NAL unit can start a picture unit or alike; and a suffix SEI NAL unit can end a picture unit or alike. Hereafter, an SEI NAL unit may equivalently refer to a prefix SEI NAL unit or a suffix SEI NAL unit. An SEI NAL unit includes one or more SEI messages, which are not required for the decoding of output pictures but may assist in related processes, such as picture output timing, post-processing of decoded pictures, rendering, error detection, error concealment, and resource reservation.

Several SEI messages are specified in H.264/AVC, H.265/HEVC, H.266/VVC, and H.274NSEI standards, and the user data SEI messages enable organizations and companies to specify SEI messages for specific use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Figure 6:
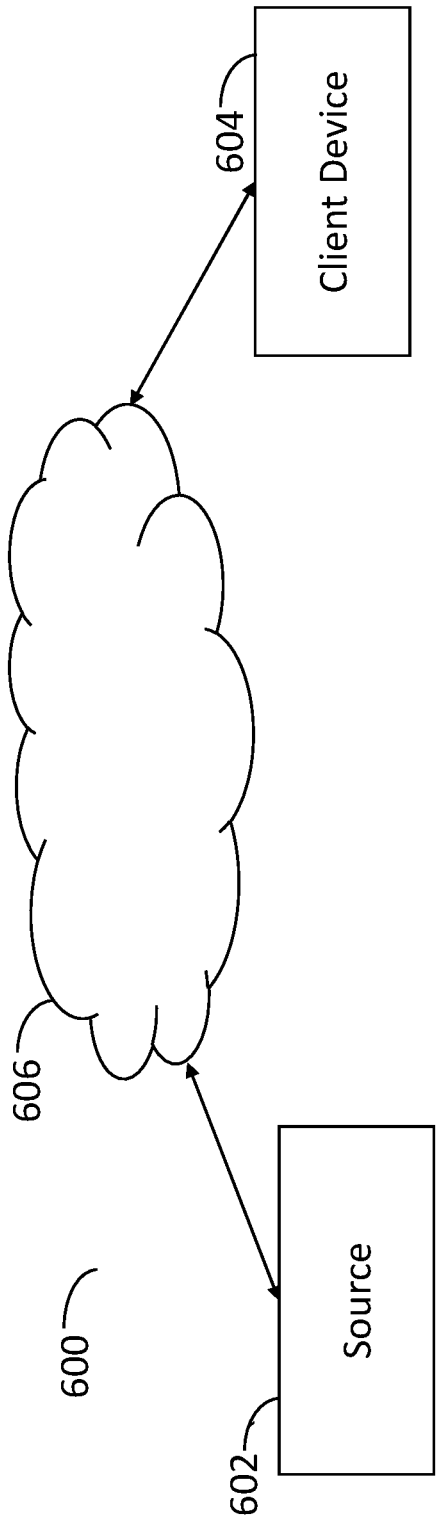
FIG. 6 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured to train or finetune a decoder side neural network. In this regard, FIG. 6 depicts an example of such a system 600 that includes a source 602 of media data and associated metadata. The source may be, in one embodiment, a server. However, the source may be embodied in other manners if so desired. The source is configured to stream the media data and associated metadata to a client device 604. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, media data and metadata are streamed via a network 606, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 7:
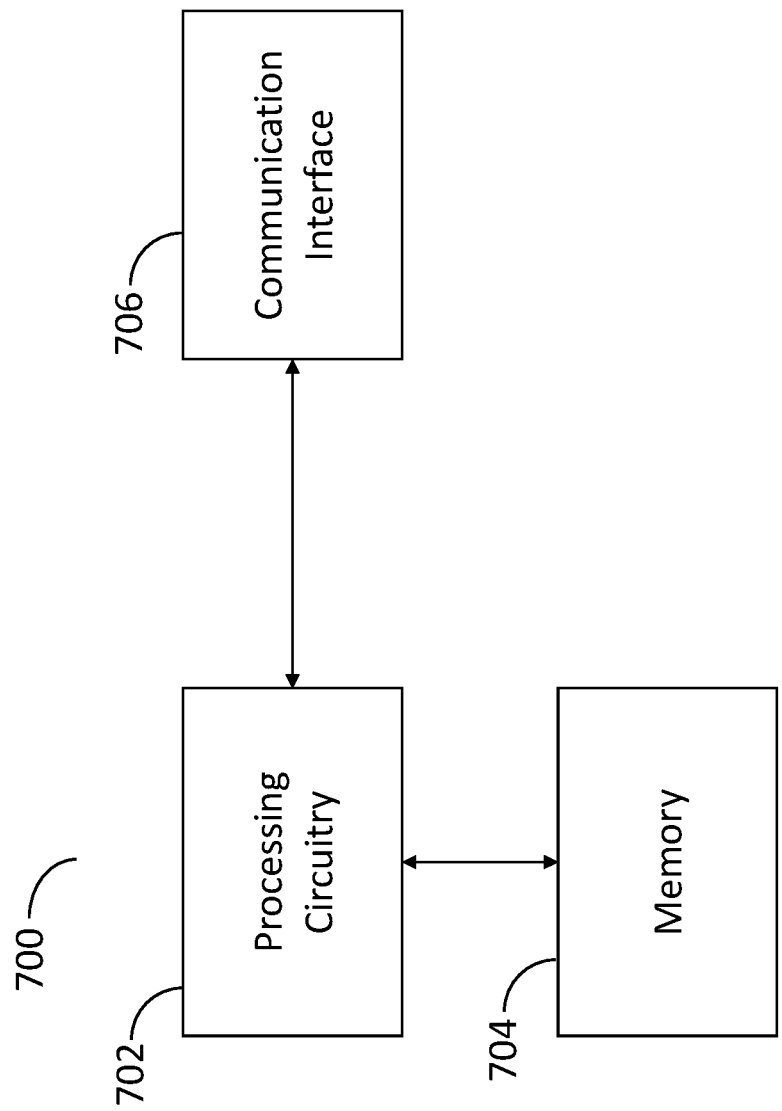
FIG. 7 is a block diagram of an apparatus that may be specifically configured in accordance with an example embodiment.

An apparatus 700 is provided in accordance with an example embodiment as shown in FIG. 7. In one embodiment, the apparatus of FIG. 7 may be embodied by the source 602, such as a file writer which, in turn, may be embodied by a server, that is configured to stream a compressed representation of the media data and associated metadata. In an alternative embodiment, the apparatus may be embodied by the client device 604, such as a file reader which may be embodied, for example, by any of the various computing devices described above. In either of these embodiments and as shown in FIG. 7, the apparatus of an example embodiment includes, is associated with or is in communication with a processing circuitry 702, one or more memory devices 704, a communication interface 706 and optionally a user interface.

The processing circuitry 702 may be in communication with the memory device 704 via a bus for passing information among components of the apparatus 700. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 700 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip.' As such, in some cases, a chip or chipset may constitute means for performing one or more operations for providing the functionalities described herein.

The processing circuitry 702 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 706 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 700 may optionally include a user interface that may, in turn, be in communication with the processing circuitry 702 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Fundamentals of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they are able to learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

If the network is learning at all—in this case, the training set error should decrease, otherwise the model is in the regime of underfitting.

If the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized the training set's properties and performs well only on that set, but performs poorly on a set not used for tuning or training its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion may be based on one or more of the following metrics: mean squared error (MSE), peak signal-to-noise ratio (PSNR), structural similarity index measure (SSIM), or the like. These distortion metrics are meant to be correlated to the human visual perception quality, so that minimizing or maximizing one or more of these distortion metrics results into improving the visual quality of the decoded image as perceived by humans.

In various embodiments, terms 'model', 'neural network', 'neural net' and 'network' may be used interchangeably, and also the weights of neural networks may be sometimes referred to as learnable parameters or as parameters.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or 'block') are predicted. In an example, the pixel values may be predicted by using motion compensation algorithm. This prediction technique includes finding and indicating an area in one of the previously coded video frames that corresponds closely to the block being coded.

In other example, the pixel values may be predicted by using spatial prediction techniques. This prediction technique uses the pixel values around the block to be coded in a specified manner Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently those are typically coded differentially with respect to block specific predicted motion vectors. In typical video codecs, the predicted motion vectors are created in a predefined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired Macroblock mode and associated motion vectors. This kind of cost function uses a weighting factor $\lambda$ to tie together the exact or estimated image distortion due to lossy coding methods and the exact or estimated amount of information that is required to represent the pixel values in an image area:

$$C=D+\lambda R \quad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Video coding specifications may enable the use of supplemental enhancement information (SEI) messages or alike. Some video coding specifications include SEI NAL units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation.

Several SEI messages are specified in H.264/AVC, H.265/HEVC, H.266/VVC, and H.274NSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A design principle has been followed for SEI message specifications: the SEI messages are generally not extended in future amendments or versions of the standard.

Filters in Video Codecs

Conventional image and video codecs use a set of filters to enhance the visual quality of the predicted and error-compensated visual content and can be applied either in-loop or out-of-loop, or both. In the case of in-loop filters, the filter applied on one block in the currently-encoded or currently decoded frame will affect the encoding or decoding of another block in the same frame and/or in another frame which is predicted from the current frame. An in-loop filter can affect the bitrate and/or the visual quality. An enhanced block may cause a smaller residual, e.g., a smaller difference between original block and filtered block, thus using less bits in the bitstream output by the encoder. An out-of-loop filter may be applied on a frame or part of a frame after it has been reconstructed, the filtered visual content may not be a source for prediction, and thus it may only impact the visual quality of the frames that are output by the decoder.

Information on Neural Network Based Image/Video Coding

Recently, neural networks (NNs) have been used in the context of image and video compression, by following mainly two approaches.

In one approach, NNs are used to replace or as an addition to one or more of the components of a traditional codec such as VVC/H.266. Here, by 'traditional', it is meant, those codecs whose components and their parameters are typically not learned from data by means of a training process, for example those codecs whose components are not neural networks. Some examples of uses of neural networks within a traditional codec include but are not limited to:

Additional in-loop filter, for example by having the NN as an additional in-loop filter with respect to the traditional loop filters.

Single in-loop filter, for example by having the NN replacing all traditional in-loop filters.

Intra-frame prediction, for example as an additional intra-frame prediction mode, or replacing the traditional intra-frame prediction.

Inter-frame prediction, for example as an additional inter-frame prediction mode, or replacing the traditional inter-frame prediction.

Transform and/or inverse transform, for example as an additional transform and/or inverse transform, or replacing the traditional transform and/or inverse transform.

Probability model for the arithmetic codec, for example as an additional probability model, or replacing the traditional probability model.

Figure 8:
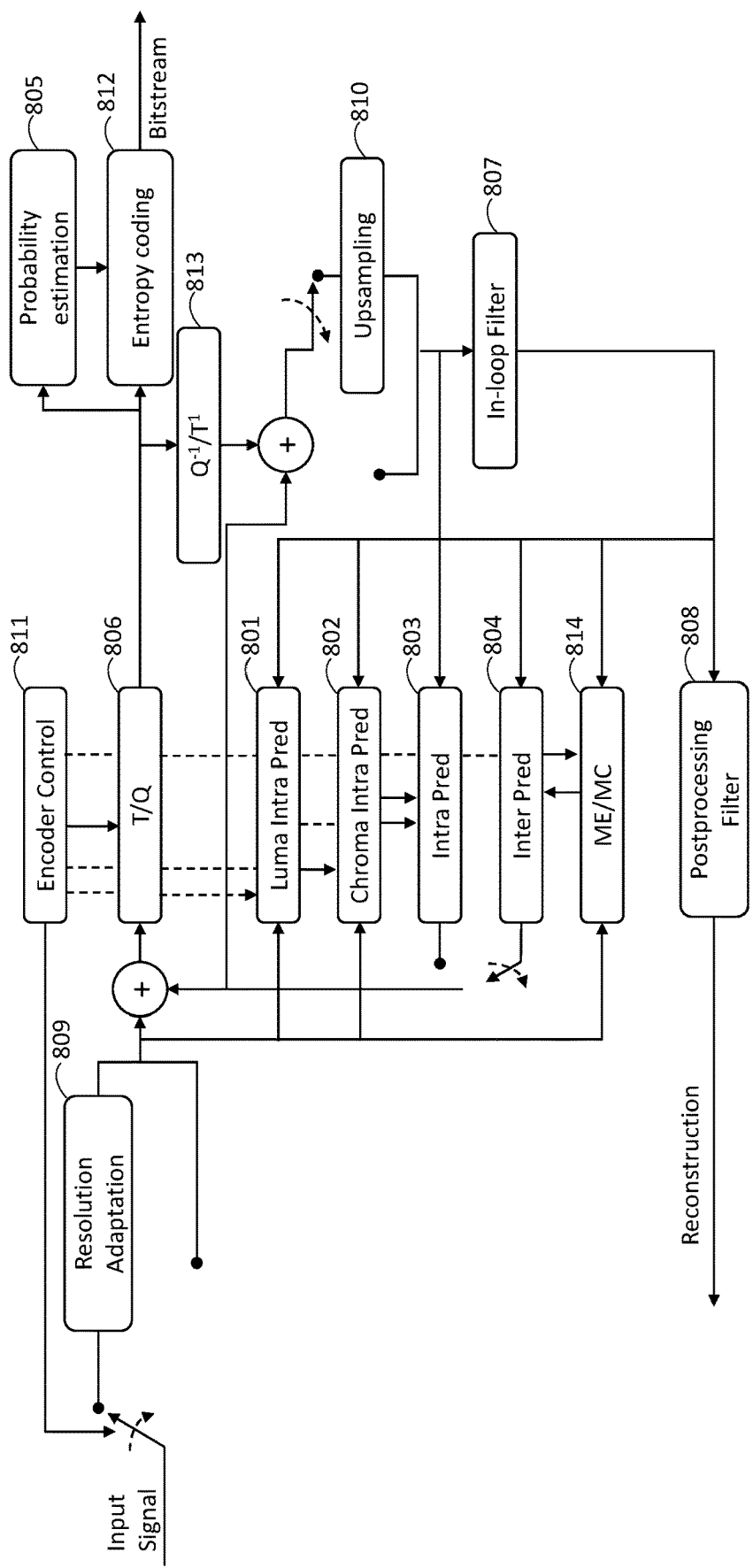
FIG. 8 illustrates examples of functioning of neural networks (NNs) as components of a traditional codec's pipeline, in accordance with an example embodiment.

FIG. 8 illustrates examples of functioning of NNs as components of a traditional codec's pipeline, in accordance with an embodiment. In particular, FIG. 8 illustrates an encoder, which also includes a decoding loop. FIG. 8 is shown to include components described below:

A luma intra pred block or circuit 801. This block or circuit performs intra prediction in the luma domain, for example, by using already reconstructed data from the same frame. The operation of the luma intra pred block or circuit 801 may be performed by a deep neural network such as a convolutional auto-encoder.

A chroma intra pred block or circuit 802. This block or circuit performs intra prediction in the chroma domain, for example, by using already reconstructed data from the same frame. The chroma intra pred block or circuit 802 may perform cross-component prediction, for example, predicting chroma from luma. The operation of the chroma intra pred block or circuit 802 may be performed by a deep neural network such as a convolutional auto-encoder.

An intra pred block or circuit 803 and an inter-pred block or circuit 804. These blocks or circuit perform intra prediction and inter-prediction, respectively. The intra pred block or circuit 803 and the inter-pred block or circuit 804 may perform the prediction on all components, for example, luma and chroma. The operations of the intra pred block or circuit 803 and the inter-pred block or circuit 804 may be performed by two or more deep neural networks such as convolutional auto-encoders.

A probability estimation block or circuit 805 for entropy coding. This block or circuit performs prediction of probability for the next symbol to encode or decode, which is then provided to the entropy coding module 812, such as an arithmetic coding module, to encode or decode the next symbol. The operation of the probability estimation block or circuit 805 may be performed by a neural network.

A transform and quantization (T/Q) block or circuit 806. These are actually two blocks or circuits. The transform and quantization block or circuit 806 may perform a transform of input data to a different domain, for example, the FFT transform would transform the data to frequency domain. The transform and quantization block or circuit 806 may quantize its input values to a smaller set of possible values. In the decoding loop, there may be inverse quantization block or circuit and inverse transform block or circuit 813. One or both of the transform block or circuit and quantization block or circuit may be replaced by one or two or more neural networks. One or both of the inverse transform block or circuit and inverse quantization block or circuit 813 may be replaced by one or two or more neural networks.

An in-loop filter block or circuit 807. Operations of the in-loop filter block or circuit 807 is performed in the decoding loop, and it performs filtering on the output of the inverse transform block or circuit, or anyway on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 807 may be performed by a neural network, such as a convolutional auto-encoder. In examples, the operation of the in-loop filter may be performed by multiple steps or filters, where the one or more steps may be performed by neural networks.

A post-processing filter block or circuit 808. The post-processing filter block or circuit 808 may be performed only at decoder side, as it may not affect the encoding process. The post-processing filter block or circuit 808 filters the reconstructed data output by the in-loop filter block or circuit 807, in order to enhance the reconstructed data. The post-processing filter block or circuit 808 may be replaced by a neural network, such as a convolutional auto-encoder.

A resolution adaptation block or circuit 809: this block or circuit may downsample the input video frames, prior to encoding. Then, in the decoding loop, the reconstructed data may be upsampled, by the upsampling block or circuit 810, to the original resolution. The operation of the resolution adaptation block or circuit 809 block or circuit may be performed by a neural network such as a convolutional auto-encoder.

An encoder control block or circuit 811. This block or circuit performs optimization of encoder's parameters, such as what transform to use, what quantization parameters (QP) to use, what intra-prediction mode (out of N intra-prediction modes) to use, and the like. The operation of the encoder control block or circuit 811 may be performed by a neural network, such as a classifier convolutional network, or such as a regression convolutional network.

Figure 9:
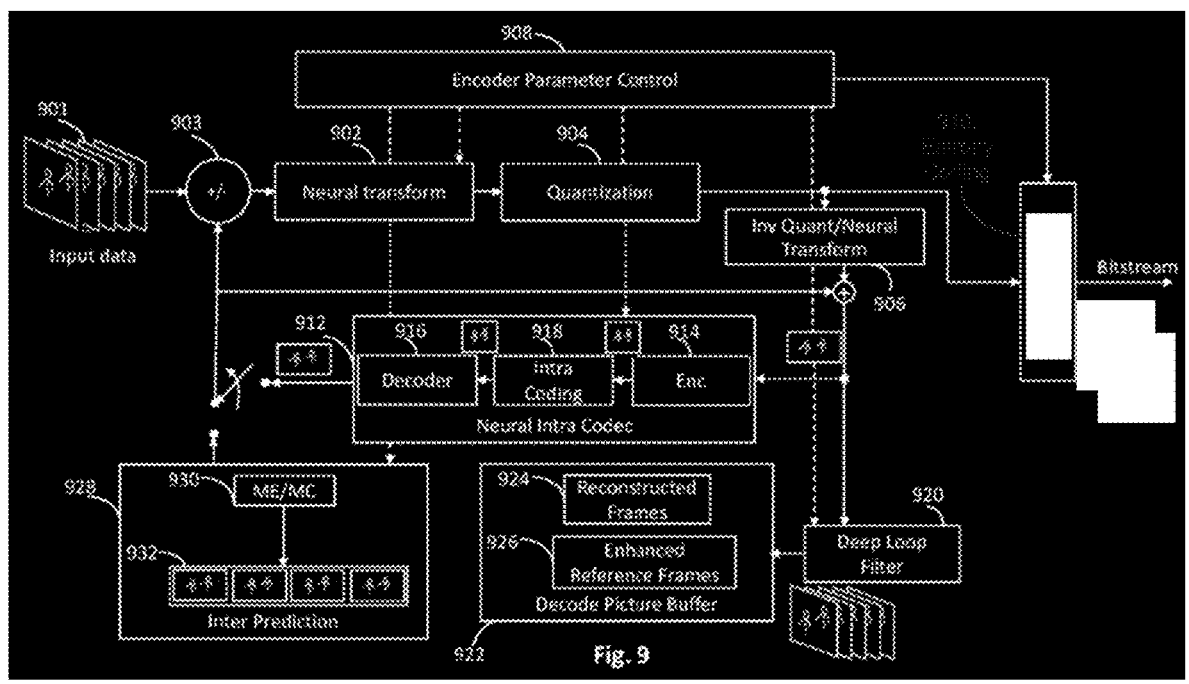
FIG. 9 illustrates an example of modified video coding pipeline based on neural networks, in accordance with an example embodiment.

An ME/MC block or circuit 814 performs motion estimation and/or motion compensation, which are two key operations to be performed when performing inter-frame prediction. ME/MC stands for motion estimation/motion compensation In another approach, commonly referred to as 'end-to-end learned compression', NNs are used as the main components of the image/video codecs. In this second approach, there are two main options:

Option 1: re-use the video coding pipeline but replace most or all the components with NNs. Referring to FIG. 9, it illustrates an example of modified video coding pipeline based on neural networks, in accordance with an embodiment. An example of neural network may include, but is not limited, a compressed representation of a neural network. FIG. 9 is shown to include following components:

A neural transform block or circuit 902: this block or circuit transforms the output of a summation/subtraction operation 903 to a new representation of that data, which may have lower entropy and thus be more compressible.

A quantization block or circuit 904: this block or circuit quantizes an input data 901 to a smaller set of possible values.

An inverse transform and inverse quantization blocks or circuits 906. These blocks or circuits perform the inverse or approximately inverse operation of the transform and the quantization, respectively.

An encoder parameter control block or circuit 908. This block or circuit may control and optimize some or all the parameters of the encoding process, such as parameters of one or more of the encoding blocks or circuits.

An entropy coding block or circuit 910. This block or circuit may perform lossless coding, for example based on entropy. One popular entropy coding technique is arithmetic coding.

A neural intra-codec block or circuit 912. This block or circuit may be an image compression and decompression block or circuit, which may be used to encode and decode an intra frame. An encoder 914 may be an encoder block or circuit, such as the neural encoder part of an auto-encoder neural network. A decoder 916 may be a decoder block or circuit, such as the neural decoder part of an auto-encoder neural network. An intra-coding block or circuit 918 may be a block or circuit performing some intermediate steps between encoder and decoder, such as quantization, entropy encoding, entropy decoding, and/or inverse quantization.

A deep loop filter block or circuit 920. This block or circuit performs filtering of reconstructed data, in order to enhance it.

A decode picture buffer block or circuit 922. This block or circuit is a memory buffer, keeping the decoded frame, for example, reconstructed frames 924 and enhanced reference frames 926 to be used for inter prediction An inter-prediction block or circuit 928. This block or circuit performs inter-frame prediction, for example, predicts from frames, for example, frames 932, which are temporally nearby. An ME/MC 930 performs motion estimation and/or motion compensation, which are two key operations to be performed when performing inter-frame prediction. ME/MC stands for motion estimation/motion compensation.

In order to train the neural networks of this system, a training objective function, referred to as 'training loss', is typically utilized, which usually comprises one or more terms, or loss terms, or simply losses. Although here the Option 2 and FIG. 10 considered as example for describing the training objective function, a similar training objective function may also be used for training the neural networks for the systems in FIG. 6 and FIG. 7. In one example, the training loss comprises a reconstruction loss term and a rate loss term. The reconstruction loss encourages the system to decode data that is similar to the input data, according to some similarity metric. Examples of reconstruction losses are:

a loss derived from mean squared error (MSE);

a loss derived from multi-scale structural similarity (MS-SSIM), such as 1 minus MS-SSIM, or 1−MS-SSIM;

losses derived from the use of a pretrained neural network. For example, error (f1, f2), where f1 and f2 are the features extracted by a pretrained neural network for the input (uncompressed) data and the decoded (reconstructed) data, respectively, and error( ) is an error or distance function, such as L1 norm or L2 norm;

losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

The rate loss encourages the system to compress the output of the encoding stage, such as the output of the arithmetic encoder. 'Compressing' for example, means reducing the number of bits output by the encoding stage.

When an entropy-based lossless encoder is used, such as the arithmetic encoder, the rate loss typically encourages the output of the Encoder NN to have low entropy. The rate loss may be computed on the output of the Encoder NN, or on the output of the quantization operation, or on the output of the probability model. Example of rate losses are the following:

A differentiable estimate of the entropy.

A sparsification loss, for example, a loss that encourages the output of the Encoder NN or the output of the quantization to have many zeros. Examples are L0 norm, L1 norm, L1 norm divided by L2 norm.

A cross-entropy loss applied to the output of a probability model, where the probability model may be a NN used to estimate the probability of the next symbol to be encoded by the arithmetic encoder.

One or more of reconstruction losses may be used, and one or more of the rate losses may be used. All the loss terms may then be combined for example as a weighted sum to obtain the training objective function. Typically, the different loss terms are weighted using different weights, and these weights determine how the final system performs in terms of rate-distortion loss. For example, if more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

For the sake of explanation, video is considered as data type in various embodiments. However, it would be understood that the embodiments are also applicable to other media items, for example images and audio data.

It is to be understood that even in end-to-end learned approaches, there may be components which are not learned from data, such as an arithmetic codec.

Figure 10:
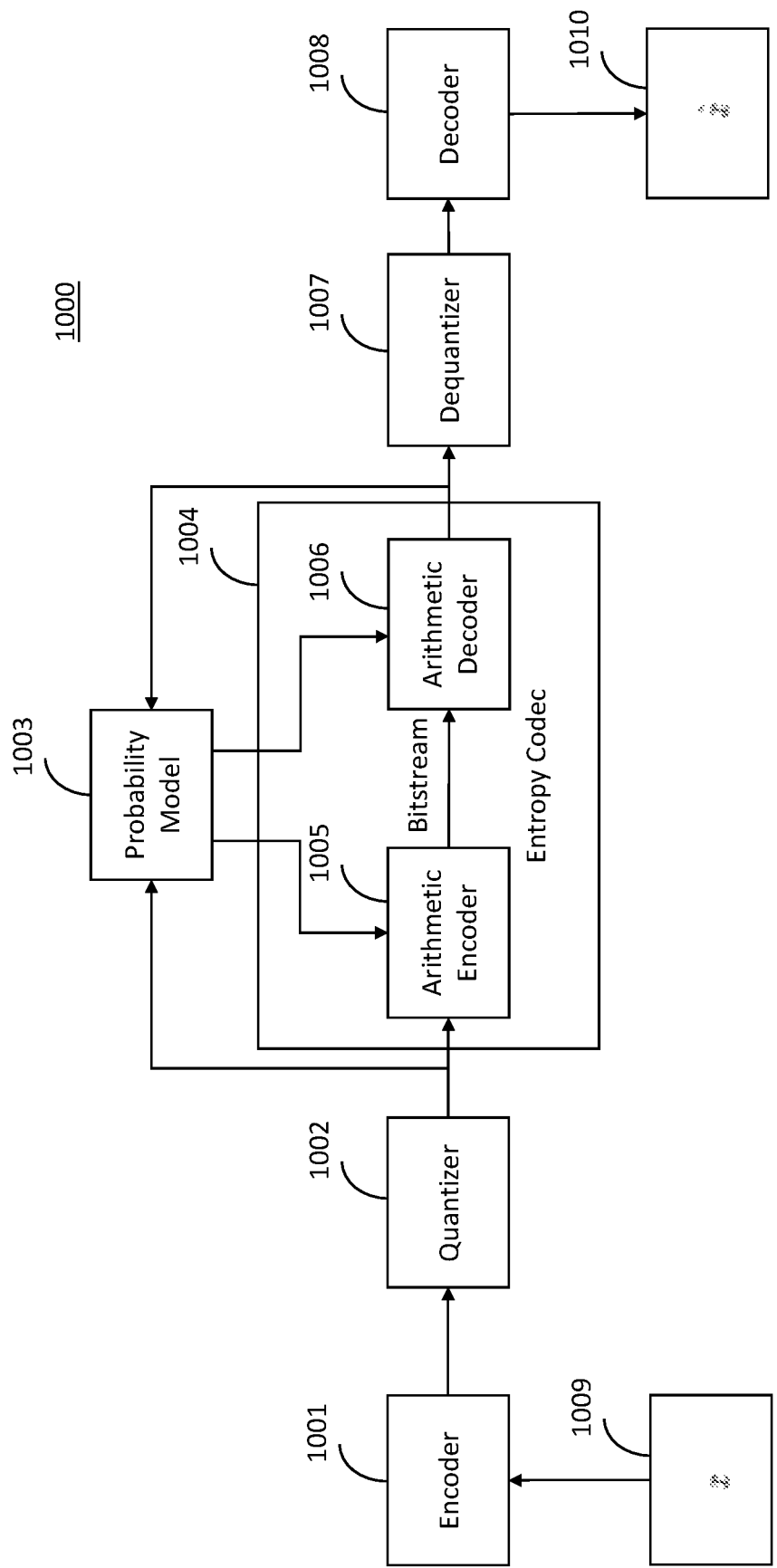
FIG. 10 is an example neural network-based end-to-end learned video coding system, in accordance with an example embodiment.

Option 2 is illustrated in FIG. 10, and it consists of a different type of codec architecture. Referring to FIG. 10, it illustrates an example neural network-based end-to-end learned video coding system, in accordance with an example embodiment. As shown FIG. 10, a neural network-based end-to-end learned video coding system 1000 contains an encoder 1001, a quantizer 1002, a probability model 1003, an entropy codec 1004, for example, an arithmetic encoder 1005 and an arithmetic decoder 1006, a dequantizer 1007, and a decoder 1008. The encoder 1001 and the decoder 1008 are typically two neural networks, or mainly comprise neural network components. The probability model 1003 may also comprise mainly neural network components. The quantizer 1002, the dequantizer 1007, and the entropy codec 1004 are typically not based on neural network components, but they may also potentially comprise neural network components. In some embodiments, the encoder, quantizer, probability model, entropy codec, arithmetic encoder, arithmetic decoder, dequantizer, and decoder, may also be referred to as an encoder component, quantizer component, probability model component, entropy codec component, arithmetic encoder component, arithmetic decoder component, dequantizer component, and decoder component respectively.

On the encoding side, the encoder 1001 takes a video/image as an input 1009 and converts the video/image in original signal space into a latent representation that may comprise a more compressible representation of the input. The latent representation may be normally a 3-dimensional tensor for image compression, where 2 dimensions represent spatial information, and the third dimension contains information at that specific location.

Consider an example, in which the input data is an image, if the input image is a 128×128×3 RGB image (with horizontal size of 128 pixels, vertical size of 128 pixels, and 3 channels for the Red, Green, Blue color components), and if the encoder downsamples the input tensor by 2 and expands the channel dimension to 32 channels, then the latent representation is a tensor of dimensions (or 'shape') 64×64×32 (e.g., with horizontal size of 64 elements, vertical size of 64 elements, and 32 channels). Please note that the order of the different dimensions may differ depending on the convention which is used; in some embodiments, for the input image, the channel dimension may be the first dimension, so for the above example, the shape of the input tensor may be represented as 3×128×128, instead of 128×128×3.

In the case of an input video (instead of just an input image), another dimension in the input tensor may be used to represent temporal information.

The quantizer 1002 quantizes the latent representation into discrete values given a predefined set of quantization levels. The probability model 1003 and the arithmetic encoder 1005 work together to perform lossless compression for the quantized latent representation and generate bitstreams to be sent to the decoder side. Given a symbol to be encoded to the bitstream, the probability model 1003 estimates the probability distribution of all possible values for that symbol based on a context that is constructed from available information at the current encoding/decoding state, such as the data that has already encoded/decoded. The arithmetic encoder 1005 encodes the input symbols to bitstream using the estimated probability distributions.

On the decoding side, opposite operations are performed. The arithmetic decoder 1006 and the probability model 1003 first decode symbols from the bitstream to recover the quantized latent representation. Then, the dequantizer 1007 reconstructs the latent representation in continuous values and pass it to the decoder 1008 to recover the input video/image. The recovered input video/image is provided as an output 1010. Note that the probability model 1003, in this system 1000, is shared between the arithmetic encoder 1005 and the arithmetic decoder 1006. In practice, this means that a copy of the probability model 1003 is used at the arithmetic encoder 1005 side, and another exact copy is used at the arithmetic decoder 1006 side.

In this system 1000, the encoder 1001, the probability model 1003, and the decoder 1008 are normally based on deep neural networks. The system 1000 is trained in an end-to-end manner by minimizing the following rate-distortion loss function, which may be referred to simply as training loss, or loss:

$$L=D+\lambda R \qquad \text{equation 2}$$

In equation 2, D is the distortion loss term, R is the rate loss term, and is the weight that controls the balance between the two losses.

The distortion loss term may be referred to also as reconstruction loss. It encourages the system to decode data that is similar to the input data, according to some similarity metric. Examples of reconstruction losses are:

a loss derived from mean squared error (MSE).

a loss derived from multi-scale structural similarity (MS-SSIM), such as 1 minus MS-SSIM, or 1−MS-SSIM.

losses derived from the use of a pretrained neural network. For example, error (f1, f2), where f1 and f2 are the features extracted by a pretrained neural network for the input (uncompressed) data and the decoded (reconstructed) data, respectively, and error( ) is an error or distance function, such as L1 norm or L2 norm.

losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

Multiple distortion losses may be used and integrated into D.

Minimizing the rate loss encourages the system to compress the quantized latent representation so that the quantized latent representation can be represented by a smaller number of bits. The rate loss may be computed on the output of the encoder NN, or on the output of the quantization operation, or on the output of the probability model. In one example embodiment, the rate loss may comprise multiple rate losses. Example of rate losses are the following:

- a differentiable estimate of the entropy of the quantized latent representation, which indicates the number of bits necessary to represent the encoded symbols, for example, bits-per-pixel (bpp).
- a sparsification loss, for example, a loss that encourages the output of the Encoder NN or the output of the quantization to have many zeros. Examples are L0 norm, L1 norm, L1 norm divided by L2 norm.
- a cross-entropy loss applied to the output of a probability model, where the probability model may be a NN used to estimate the probability of the next symbol to be encoded by the arithmetic encoder 1005.

A similar training loss may be used for training the systems illustrated in FIG. 8 and FIG. 9.

One or more of reconstruction losses may be used, and one or more of the rate losses may be used. All the loss terms may then be combined for example as a weighted sum to obtain the training objective function. Typically, the different loss terms are weighted using different weights, and these weights determine how the final system performs in terms of rate-distortion loss. For example, if more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

In one example embodiment, the rate loss and the reconstruction loss may be minimized jointly at each iteration. In another example embodiment, the rate loss and the reconstruction loss may be minimized alternately, e.g., in one iteration the rate loss is minimized and in the next iteration the reconstruction loss is minimized, and so on. In yet another example embodiment, the rate loss and the reconstruction loss may be minimized sequentially, e.g., first one of the two losses is minimized for a certain number of iterations, and then the other loss is minimized for another number of iterations. These different ways of minimizing rate loss and reconstruction loss may also be combined.

It is to be understood that even in end-to-end learned approaches, there may be components which are not learned from data, such as an arithmetic codec.

For lossless video/image compression, the system 1000 contains only the probability model 1003, the arithmetic encoder 1005 and the arithmetic decoder 1006. The system loss function contains only the rate loss, since the distortion loss is always zero, in other words, no loss of information.

Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze or process data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which may be different from a quality metric for human perceptual quality. Also, dedicated algorithms for compressing and decompressing data for machine consumption may be different than those for compressing and decompressing data for human consumption. The set of tools and concepts for compressing and decompressing data for machine consumption is referred to here as Video Coding for Machines.

The decoder-side device may have multiple 'machines' or neural networks (NNs) for analyzing or processing decoded data. These multiple machines may be used in a certain combination which is for example determined by an orchestrator sub-system. The multiple machines may be used for example in temporal succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of objects in the frames.

An 'encoder-side device' may encode input data, such as a video, into a bitstream which represents compressed data. The bitstream is provided to a 'decoder-side device'. The term 'receiver-side' or 'decoder-side' refers to a physical or abstract entity or device which performs decoding of compressed data, and the decoded data may be input to one or more machines, circuits or algorithms. The one or more machines may not be part of the decoder. The one or more machines may be run by the same device running the decoder or by another device which receives the decoded data from the device running the decoder. Different machines may be run by different devices.

The encoded video data may be stored into a memory device, for example as a file. The stored file may later be provided to another device.

Alternatively, the encoded video data may be streamed from one device to another.

Figure 11:
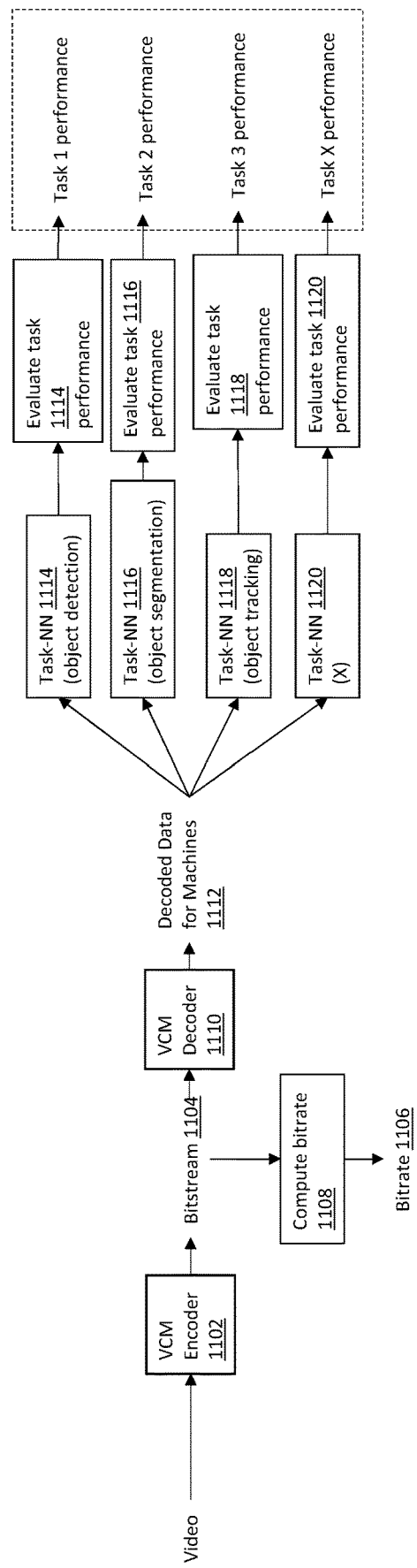
FIG. 11 illustrates a pipeline of video coding for machines (VCM), in accordance with an embodiment.

FIG. 11 illustrates a pipeline of video coding for machines (VCM), in accordance with an embodiment. A VCM encoder 1102 encodes the input video into a bitstream 1104. A bitrate 1106 may be computed 1108 from the bitstream 1104 in order to evaluate the size of the bitstream 1104. A VCM decoder 1110 decodes the bitstream 1104 output by the VCM encoder 1102. An output of the VCM decoder 1110 may be referred, for example, as decoded data for machines 1112. This data may be considered as the decoded or reconstructed video. However, in some implementations of the pipeline of VCM, the decoded data for machines 1112 may not have same or similar characteristics as the original video which was input to the VCM encoder 1102. For example, this data may not be easily understandable by a human, if the human watches the decoded video from a suitable output device such as a display. The output of the VCM decoder 1110 is then input to one or more task neural network (task-NN). For the sake of illustration, FIG. 11 is shown to include three example task-NNs, a task-NN 1114 for object detection, a task-NN 1116 for image segmentation, a task-NN 1118 for object tracking, and a non-specified one, a task-NN 1120 for performing task X. The goal of VCM is to obtain a low bitrate while guaranteeing that the task-NNs still perform well in terms of the evaluation metric associated to each task.

Figure 12:
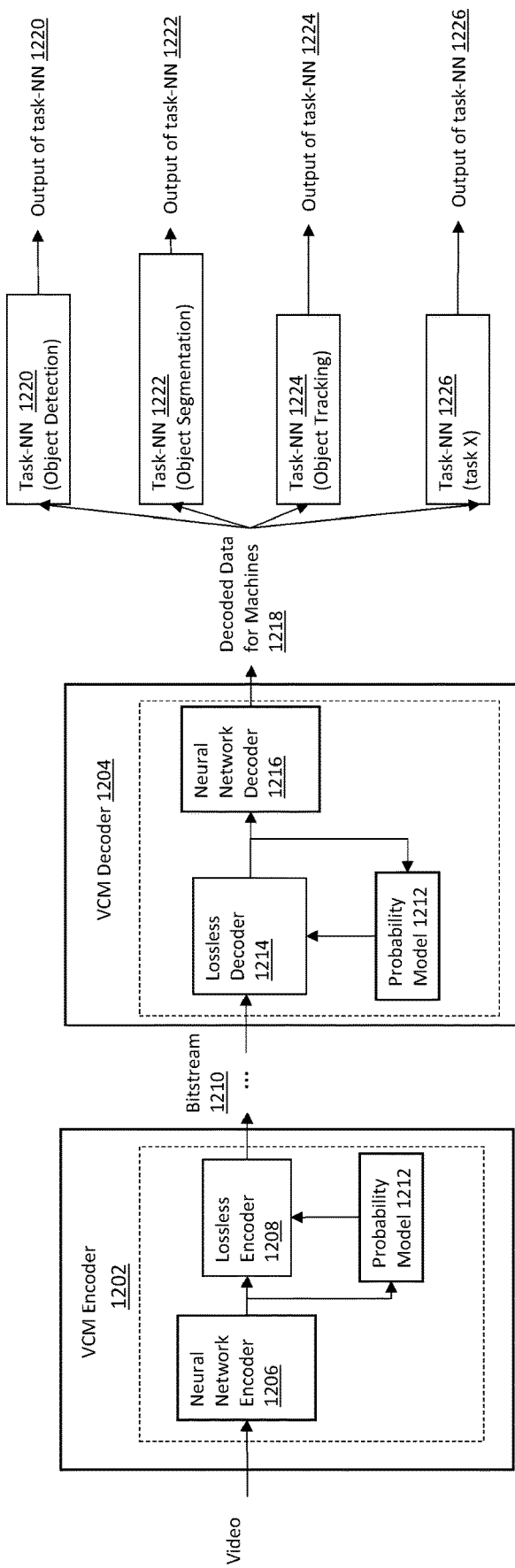
FIG. 12 illustrates an example of an end-to-end learned approach for the use case of video coding for machines, in accordance with an embodiment.

One of the possible approaches to realize video coding for machines is an end-to-end learned approach. FIG. 12 illustrates an example of an end-to-end learned approach, in accordance with an embodiment. In this approach, a VCM encoder 1202 and a VCM decoder 1204 mainly consist of neural networks. The video is input to a neural network encoder 1206. The output of the neural network encoder 1206 is input to a lossless encoder 1208, such as an arithmetic encoder, which outputs a bitstream 1210. The lossless codec or the substantially lossless codec may take an additional input from a probability model 1212, both in the lossless encoder 1208 and in a lossless decoder 1214, which predicts the probability of the next symbol to be encoded and decoded. The probability model 1212 may also be learned, for example it may be a neural network. At a decoder-side, the bitstream 1210 is input to the lossless decoder 1214, such as an arithmetic decoder, whose output is input to a neural network decoder 1216. The output of the neural network decoder 1216 is a decoded data for machines 1218, that may be input to one or more task-NNs, a task-NN 1220 for object detection, a task-NN 1222 for object segmentation, a task-NN 1224 for object tracking, and a non-specified one, a task-NN 1226 for performing task X.

Figure 13:
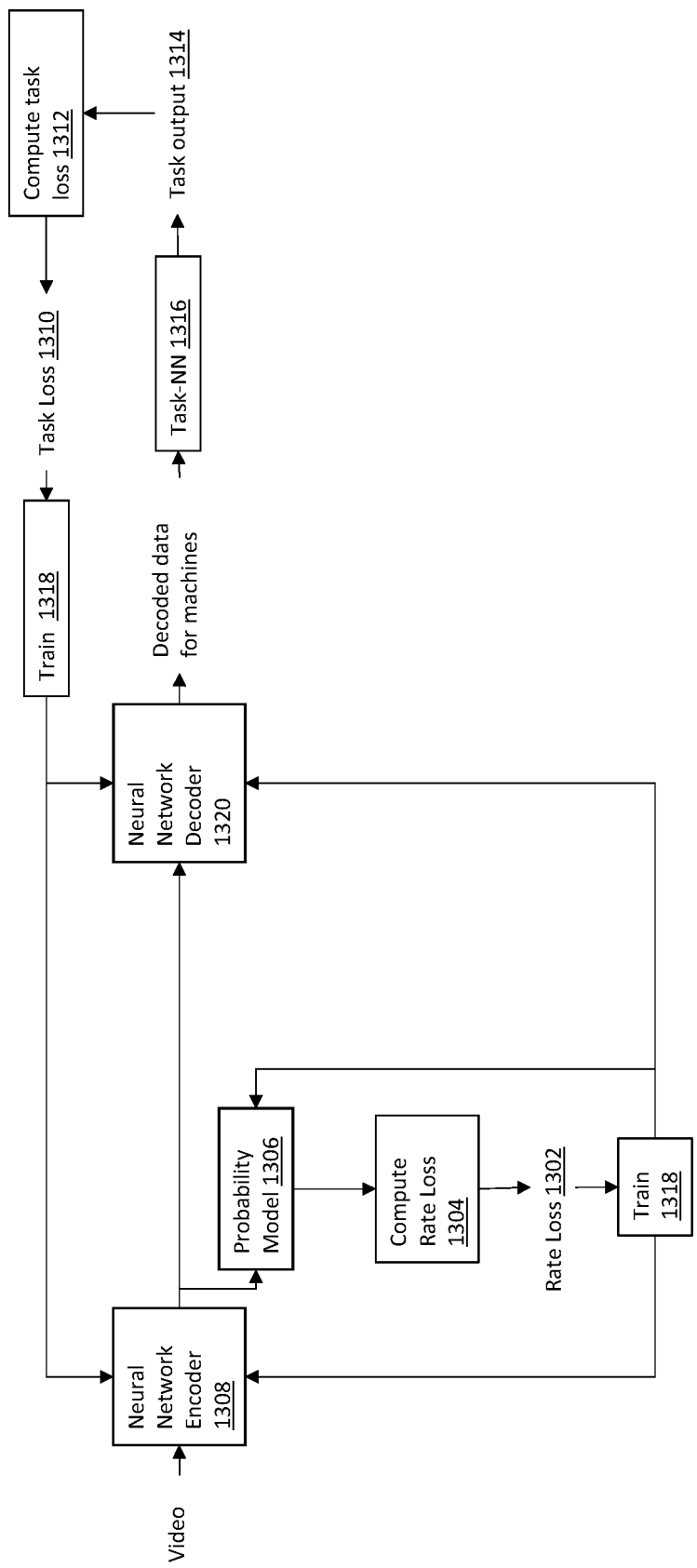
FIG. 13 illustrates an example of how the end-to-end learned system may be trained for the use case of video coding for machines, in accordance with an embodiment.

FIG. 13 illustrates an example of how the end-to-end learned system may be trained, in accordance with an embodiment. For the sake of simplicity, only one task-NN is illustrated. However, it may be understood that multiple task-NNs may be similarly used in the training process. A rate loss 1302 may be computed 1304 from the output of a probability model 1306. The rate loss 1302 provides an approximation of the bitrate required to encode the input video data, for example, by a neural network encoder 1308. A task loss 1310 may be computed 1312 from a task output 1314 of a task-NN 1316.

The rate loss 1302 and the task loss 1310 may then be used to train 1318 the neural networks used in the system, such as the neural network encoder 1308, probability model, a neural network decoder 1320. Training may be performed by first computing gradients of each loss with respect to the trainable parameters of the neural networks that are contributing or affecting the computation of that loss. The gradients are then used by an optimization method, such as Adam, for updating the trainable parameters of the neural networks. It is to be understood that, in alternative or in addition to one or more task losses and/or one or more rate losses, the training process may use additional losses which may not be directly related to one or more specific tasks, such as losses derived from pixel-wise distortion metrics (for example, MSE, MS-SSIM).

The machine tasks may be performed at decoder side (instead of at encoder side) for multiple reasons, for example, the encoder-side device may not have the capabilities (e.g. computational, power, or memory) for running the neural networks that perform these tasks, or some aspects or the performance of the task neural networks may have changed or improved by the time that the decoder-side device needs the tasks results (e.g., different or additional semantic classes, better neural network architecture). Also, there may be a need for customization, where different clients may run different neural networks for performing these machine learning tasks.

Alternatively to an end-to-end trained codec, a video codec for machines may be realized by using a traditional codec such as H.266/VVC.

Alternatively, as described already above for the case of video coding for humans, another possible design may comprise using a traditional codec such as H.266/VVC, which includes one or more neural networks. In one example implementation, the one or more neural networks may replace one or more of the components of the traditional codec, for example:

One or more in-loop filters;
One or more intra-prediction modes;
One or more inter-prediction modes;
One or more transforms;
One or more inverse transforms;
One or more probability models, for lossless coding; or
One or more post-processing filters.

In another example implementation, the one or more neural networks may function as an additional component, for example:

One or more additional in-loop filters;
One or more additional intra-prediction modes;
One or more additional inter-prediction modes;
One or more additional transforms;
One or more additional inverse transforms;
One or more additional probability models, for lossless coding; or
One or more additional post-processing filters.

Alternatively, another possible implementation may include using any codec architecture (such as a traditional codec, or a traditional codec which includes one or more neural networks, or an end-to-end learned codec), and having a post-processing neural network which adapts the output of the decoder so that the output can be analyzed more effectively by one or more machines or task neural networks. For example, the encoder and decoder may be conformant to the H.266/VVC standard, a post-processing neural network takes the output of the decoder, and the output of the post-processing neural network is then input to an object detection neural network. In this example, the object detection neural network is the machine or task neural network.

Figure 14:
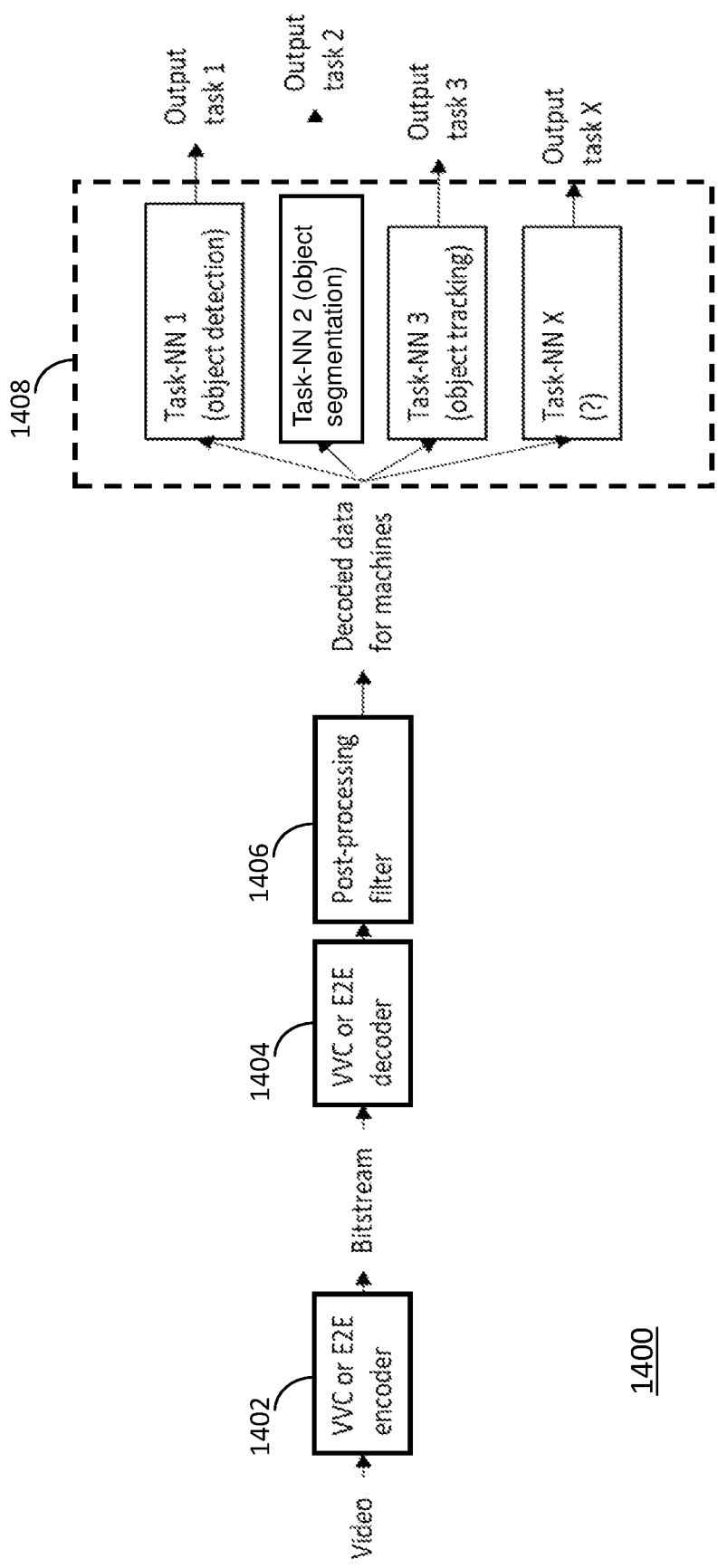
FIG. 14 illustrates an example codec architecture, in accordance with an embodiment.

FIG. 14 illustrates an example codec architecture 1400, in accordance with an embodiment. The codec architecture 1400 includes an encoder 1402, a decoder 1404, a post-processing filter 1406, a set of task-NNs 1408. The encoder 1402 and the decoder 1404 may represent a traditional image or video codec, such as a codec conformant with the VVC/H.266 standard, or may represent an end-to-end (E2E) learned image or video codec. The post-processing filter 1406 may be a neural network based filter. The set of task-NNs 1408 may be neural networks that perform tasks such as object detection, object segmentation, object tracking, and the like.

Neural networks are usually trained for a certain task on a sufficiently large dataset. However, even for very large datasets, it is unlikely that the data distribution of test data matches the data distribution of training data.

In addition, when the computational and memory complexity of a device running a neural network is limited (for example, in mobile devices), small neural networks may be preferable, for example, a NN with a small number of parameters, which may depend on hardware configuration of the device. Small NNs have less capacity, e.g., they are less capable of storing information about large training datasets. Example details on small number of parameter and small NNs may be found here: arxiv.org/pdf/1810.01109.pdf (last accessed Nov. 23, 2021).

The above two features may cause the NN to perform poorly on test data (e.g., generalize poorly), especially when the test data is sampled from a different data distribution than the data used for training the NN, and/or when the NN is small.

Various embodiments, provide a solution to these issues, by, for example, focusing on a NN used as a probability model for a data codec, such as a video codec. The codec may be an end-to-end learned codec, or a codec where the probability model used to provide probability estimates to a lossless codec or to a substantially lossless codec is a NN.

Various embodiments propose a method for improving the performance of an NN used as a probability model for a data codec, such as a video codec. The codec may be an end-to-end learned codec, or a codec where the probability model, used to provide probability estimates to a lossless codec or to a substantially lossless codec, is a NN. For example, the NN used as a probability model may provide probability estimates to an arithmetic encoder or decoder, such as a CABAC encoder or decoder. The probability model may be referred to as PM.

A copy of the same PM is assumed to be available at an encoder side, and another copy of the PM is assumed to be available at a decoder side.

In order to obtain the performance improvement, some embodiments propose to perform an overfitting operation both at the encoder side and at the decoder side. The overfitting may comprise one or more training operations applied to the PM, where some or all the parameters of the PM are trained.

The ground-truth used for the overfitting may comprise data that was previously encoded/decoded by the lossless codec (such as by an arithmetic codec).

The overfitted PM may then be used to provide probability estimates to the lossless codec or the substantially lossless codec for encoding/decoding some of the data.

Multiple overfitting operations may be performed for an image or video.

The overfitting operation may be applied on one or more of the already available versions of the PM. Then, a comparison between some of the overfitted PMs and non-overfitted PMs may be performed, and the PM with a required performance (e.g., best performance or a predefined performance) may be chosen to be used for the final encoding/decoding.

The encoder may signal to the decoder whether to perform the overfitting operation, how to perform it, and/or which data shall be decoded by using probability estimates obtained from the chosen PM.

Finetuning

In various embodiments, terms like, further training, finetuning, overfitting, and adapting may be used interchangeably. These terms may refer to the process of training a NN (e.g., training its learnable parameters) in order to improve its performance on a specific set of data. The NN may have been initialized by setting the values of its parameters to some initial values. One possible initialization method may include training the NN by using a large dataset. Another possible initialization method may include using a random or pseudo-random process, such as setting the values of the parameters to random or pseudo-random values. In one example, the NN may have been trained by using a large dataset of images or videos, and during finetuning the NN may be trained by using one image or one video. The initial values of the parameters that may then be modified by the finetuning process may be the values determined during the initialization process, or may be re-initialized before the finetuning starts.

The finetuning may be performed by iteratively modifying the values of at least some of the parameters of the NN.

The actual finetuning process is a training process, thus it may be performed similarly as the training process. For each iteration, the following operations may be performed. An input is provided to the NN. An output is obtained from the NN. A loss may be computed based on the output of the NN (or data derived from the output of the NN) and ground truth data (GT). In the case of a probability model finetuning, the loss may be computed from the output of the probability model without ground truth data, e.g., the loss is the estimated bit rate of the input, such as $-\log(p)$ where $\log(\ )$ indicates the logarithm function in base 2 and p indicates the probability estimated by the probability model. The computed loss is then used to compute an update to the parameters of the NN, for example, by first computing gradients of the loss with respect to the parameters and then using the gradients within an optimizer routine such as stochastic gradient descent or Adam. The iterative process may stop when a stopping criterion is met, e.g., when a time duration is exceeded, or when the loss has reached a value in a predefined range, or when the number of iterations has reached a maximum number, or when the loss has not decreased more than a value for a certain amount of time or certain number of iterations.

EXAMPLE EMBODIMENT

As described above, this example embodiment proposes a method for improving the performance of an NN used as a probability model for a data codec, such as a video codec. The codec may be an end-to-end learned codec, or a codec where the probability model used to provide probability estimates to a lossless codec (or to a substantially lossless codec) is a NN. The probability model may be referred to as PM.

A copy of the same PM is assumed to be available at an encoder side, and another copy of the PM is assumed to be available at a decoder side.

In order to obtain the performance improvement, this embodiment proposes to perform an overfitting operation both at the encoder side and at the decoder side. The overfitting may comprise one or more training operations applied to the PM, where some or all the parameters of the PM are trained.

The input data used for training the PM may be sampled from (or be included in) data that was previously encoded/decoded by the lossless codec (such as by an arithmetic codec). For example, the input data may be, at least one of:
- one or more previously encoded/decoded frames;
- one or more pixels of a previously encoded/decoded frame;
- one or more pixels of the currently encoded/decoded frame;
- one or more pixels that have been previously encoded/decoded, e.g. the pixels or groups of pixels encoded/decoded at the one or more previous steps when the PM encodes/decodes the pixels or groups of pixels in a frame in a sequential manner, where the one or more pixels are part of a frame;
- one or more previously encoded/decoded latent tensor (or feature tensor);

one or more elements of a previously encoded/decoded latent tensor (or feature tensor);

one or more elements of the currently encoded/decoded latent tensor (or feature tensor); or one or more elements that have been previously encoded/decoded, e.g. the elements or groups of elements encoded/decoded at the one or more previous steps when the PM encodes/decodes the elements or groups of elements in a latent tensor in a sequential manner, where the one or more elements are part of a latent tensor (or feature tensor).

In various embodiments, the data from which input data are sampled is referred to as overfitting media item (OMI). The OMI is data that was previously encoded/decoded. There may be different types of OMI, for example:

A portion of a frame, or features extracted therefrom;

A downsampled version of a frame, or features extracted therefrom;

A set of portions of a frame, or features extracted therefrom;

A set of portions of a set of frames, or features extracted therefrom;

One frame of a video, or features extracted therefrom;

A set of frames of a video (e.g., one or more frames from a Random Access segment), or features extracted therefrom;

All frames in a video, or features extracted therefrom; and/or

A set of videos, or features extracted therefrom.

In an embodiment, a set of portions of a set of frames forming OMI is an isolated-region picture group. An isolated region may be defined as a picture region that is allowed to depend only on the corresponding isolated region in reference pictures for prediction and does not depend on any other picture regions in the current picture or in the reference pictures. The corresponding isolated region in reference pictures may be for example the picture region that collocates with the isolated region in a current picture. A coded isolated region may be decoded without the presence of any picture regions of the same coded picture. Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed. The first isolated region in an isolated-region picture group, in decoding order, may be intra-coded. An H.266/VVC subpicture can be independent of other subpictures, when its boundaries are treated like picture boundaries and when loop filtering is disabled across its boundaries, and hence can be regarded as an isolated region. A sequence of H.266/VVC subpictures that are collocated and have the same subpicture identifier value may be regarded as an isolate-region picture group.

In an embodiment, a frame of video forming OMI comprises a random access point picture or alike, which may be an intra-coded picture.

In an embodiment, a set of frames of video forming OMI includes pictures of a selected number of lowest temporal sublayers in a bitstream where pictures are coded at several sublayers such that a picture at sublayer N may be predicted or may depend on pictures at sublayer less than or equal to N and does not depend on any picture at sublayer greater than N.

In an embodiment, a set of frames of video forming OMI comprises pictures of selected scalability layers in a bitstream such that scalability layers may be predicted on other scalability layers in a manner that scalability layers in OMI do not depend on scalability layers not included in OMI. Scalability layers may for example represent different spatial resolutions, and OMI may, for example, include the scalability layer having the lowest spatial resolution.

In an embodiment, multiple overfitting operations may be performed for an image or a video. Each overfitting operation may be performed on a different type of OMI. For example, one overfitting may be performed on a frame, and another overfitting may be performed on all subsequent frames.

The overfitting operation may be applied on one or more of the already available versions of the PM, that are referred to as base PMs. The base PMs may include One or more default PMs (for example, a PM that was trained offline, during the stage of developing or deploying the codec);

The latest overfitted PM (e.g., the PM overfitted on the latest encoded/decoded OMI); or Another previously overfitted PM (e.g., the PM overfitted on a previously encoded/decoded OMI).

The overfitted PMs and/or the previously available PMs may then be used in the encoding/decoding process of some of the data that follow the OMI in the encoding/decoding order, which is referred to as inference media item (IMI).

The IMI may include one or more of the following:

A portion of a frame, or features extracted therefrom;

A set of portions of a frame, or features extracted therefrom;

A set of portions of a set of frames, or features extracted therefrom;

One frame of a video, or features extracted therefrom;

A set of frames of a video (e.g., frame from a Random Access segment), or features extracted therefrom;

All frames in a video, or features extracted therefrom; or

A set of videos, or features extracted therefrom.

In an embodiment, a set of portions of a set of frames forming IMI comprises isolated regions of an isolated-region picture group following, in decoding order, the isolated regions forming the respective OMI.

In an embodiment, IMI comprises inter-coded frames following, in decoding order, an intra-coded frame that forms OMI.

In an embodiment, OMI comprises the previous random access picture of a video bitstream (e.g., as an intra-coded picture), a video encoder creates a dependent random access point (DRAP) picture by encoding an inter-coded picture that only depends on the previous random access picture, and IMI comprises frames comprising the DRAP frame. IMI may additionally comprise frames predicted from and/or depending on the DRAP frame.

In an embodiment, a set of frames of video forming OMI comprises pictures of a selected number of N lowest temporal sublayers in a bitstream and a set of frames of video forming IMI comprises temporal layers greater than N in the bitstream, where pictures are coded at several sublayers such that a picture at sublayer N may be predicted or may depend on pictures at sublayer less than or equal to N and does not depend on any picture at sublayer greater than N.

In an embodiment, a set of frames of video forming OMI comprises pictures of selected N lowest scalability layers in a bitstream and a set of frames of video forming IMI comprises pictures of scalability layers not among the N lowest scalability layers, wherein scalability layers in OMI do not depend on scalability layers not in IMI. Scalability layers may, for example, represent different spatial resolutions, and OMI may for example comprise the scalability layer(s) having lower spatial resolution than the scalability layer(s) in IMI.

The encoder may determine the coding gains brought by the different PMs for the chosen IMI, compare them and select the optimal PM, e.g. the PM that provides the minimal bit rate estimation including overheads for the signaling from the encoder to the decoder, for the chosen IMI.

In an example, the encoder may overfit a default PM (acting as the base PM) on a previously encoded/decoded frame (representing the OMI), then compare the overfitted PM and the default PM in terms of coding gains obtained when using these PMs on the current frame (representing the IMI), and determine which PM provides the highest or better coding gain.

In another example, the encoder may overfit the default PM and a latest overfitted PM (both representing the base PMs), then compare these two overfitted models among themselves and with respect to the default PM and the latest overfitted PM, in terms of coding gains obtained when using the PMs on the current frame, and determine which PM provides the highest or better coding gain.

The encoder may determine which version of PM is optimal for the IMI based, for example:
  on coding gain, for example, the bitrate decrease when the PM is used to provide probability estimates to a lossless codec or a substantially lossless codec.
  on the trade-off between the coding gain (such as the bitrate decrease) and computational and/or memory complexity of the overfitting operation, for example, based also on information about the capabilities of the decoder side device (when available).

Signaling Features

The information that the encoder may signal to the decoder may include one or more of the following:
  Whether to perform the overfitting operation;
  Which version of the probability model shall be used when the overfitting operation shall not be performed;
  Which version of the probability model shall be used as base PM for performing the overfitting operation;
  Which OMI shall be used for performing the overfitting operation. This may include a type of OMI and coordinates to uniquely identify a specific OMI; or
  Which data (e.g., IMI) shall be decoded by using the PM referred in this signaling;
  Information on how to perform the training, which is part of the overfitting operation, such as a number of epochs or iterations, a learning rate(s), an optimizer routine, a loss function(s), a loss function schedule (e.g., using first a certain loss function and then another loss function), data preprocessing information (such as, cropping, normalization), any seeds for pseudo-random processes, and any other information which is needed by the decoder to perform the overfitting operation in the same or substantially same way as it is performed by the encoder, such as the computing platform (e.g., whether it is CPU or GPU, and eventually which model or characteristics of the CPU/GPU), information to compensate for errors caused by rounding operations and by the precision of the computing platform, and the like.

In an embodiment, OMI is made accessible separately from IMI, and/or OMI is accessed separately from IMI. Furthermore, spatial, temporal, or spatiotemporal portions of OMI may be made accessible in a manner that they can be mapped to the respective spatial, temporal, or spatiotemporal portions of IMI. For example, timestamps and/or time ranges may be used to map respective temporal or spatiotemporal portions of OMI and IMI.

An embodiment includes following:
  accessing IMI starting from a certain spatial, temporal, or spatiotemporal portion;
  identifying and accessing the respective spatial, temporal, or spatiotemporal portion of OMI;
  overfitting the PM with the accessed portion of the OMI; and
  decoding the IMI using the finetuned PM.

For example, OMI may be included in or accessed from in a first track of a media file, which may, for example, be compliant with the ISO base media file format, and IMI may be included in or accessed from a second track of the media file. In another example, OMI may be included in or accessed from a first representation for streaming and IMI may be included in or accessed from a second representation for streaming, wherein the representations which may, for example, be compliant with a representation of dynamic adaptive streaming over HTTP (ISO/IEC 23009-1). Representations may comprise segments, each of which may comprise media for a certain time range, and segments of different representations may be aligned in their time ranges. A segment of OMI may be accessed with a first request, such as an HTTP GET request, from a client apparatus to a server apparatus, and a respective (e.g., time-aligned) segment of IMI may be accessed with a second request, such as an HTTP GET request, from a client apparatus to a server apparatus.

Example Implementation

The signaling may comprise a variable that informs the decoder whether to use an already available model, or to perform overfitting and which base PM to use. The variable may take one of the following possible values:
  0, specifying to use one of the default probability models (e.g., pretrained);
  1, specifying to use the latest overfitted probability model
  2, specifying to use one of the previously overfitted probability models;
  3, specifying to overfit one of the default probability models;
  4, specifying to overfit the latest overfitted probability model; or
  5, specifying to overfit another previously overfitted probability model.

When value 0, 2, 3 or 5 is signaled, the encoder may also signal information indicating which version of the probability model shall be used or overfitted.

The signaling may also include a variable that informs the decoder about which data (e.g., IMI) shall be decoded by using the indicated model. When this information is not signaled, the decoder shall use the indicated model for the default data, such as all the data in decoding order, until otherwise signaled. The variable can take one of the following possible values:
  0, specifying to use the indicated PM for the next data to be decoded, until further notice;
  1, specifying to use the indicated PM for the current frame only;
  2, specifying to use the indicated PM for the current RA segment;
  3, specifying to use the indicated PM for the current temporal layer;
  4, specifying to use the indicated PM for the frames indicated by variables signaled separately; or 5, specifying to use the indicated PM for the regions and frames indicated by variables signaled separately.

When value 4 or 5 is signaled, the encoder may also signal information indicating which frames, or which regions and frames, shall be decoded by using the indicated PM.

In one additional or alternative embodiment, the information that is signaled by the encoder to the decoder may be determined by the encoder side device such that the overfitting operation performed at decoder side has low computational and/or memory complexity. For example, the encoder may perform more than one overfitting operation for the same IMI, where different overfitting operations for the same IMI may comprise using different training hyper-parameters (such as different learning rates, different random seeds, different loss functions, different loss function schedules, different optimization routines, different data pre-processing techniques, and/or the like), using different OMIs, and/or using different versions of PMs as base PM. After the encoder has performed the multiple overfitting operations for the same IMI, the encoder may determine the configuration (e.g., set of hyper-parameters and other information about how to perform the overfitting operation) that requires less computational and/or memory complexity and signal it to the decoder in or along the bitstream.

Decoder Side Operations

The decoder parses the signaling related to the overfitting operation, in order to determine:
- Whether to perform the overfitting operation;
- Which version of the probability model shall be used when the overfitting operation shall not be performed;
- Which version of the probability model shall be used as base PM for performing the overfitting operation;
- Which OMI to use for performing the overfitting operation;
- Which IMI shall be decoded by using the indicated PM; and/or
- How to perform the training (e.g., number of epochs, and the like).

The decoder then proceeds with selecting the PM indicated by the encoder, and eventually performing the overfitting operation.

The selected (and eventually overfitted) PM is then used for decoding the IMI.

Use within Intra-Frame Codec and Inter-Frame Codec

When the video codec comprises a learned intra-frame codec, the OMI may include the previously encoded/decoded intra frame, and the IMI may include the currently encoded/decoded intra frame.

When the video codec includes a learned inter-frame codec, the OMI may include one or more previously encoded/decoded frames, and the IMI may include the currently encoded/decoded inter frame. In another embodiment, the OMI may include the previously encoded/decoded inter frame belonging to the same temporal layer as the currently encoded/decoded inter frame, and the IMI may include the currently encoded/decoded inter frame.

In one embodiment, when the PM is part of an inter-frame codec, the base PM may be chosen among the following options:
- One or more default PMs (for example, a PM that was trained offline, during the stage of developing or deploying the codec);
- The PM overfitted on the latest encoded/decoded OMI belonging to the same temporal layer (e.g., a sublayer) as the IMI; or
- Another previously overfitted PM, where the PM was overfitted on a previously encoded/decoded OMI belonging to the same temporal layer (e.g., the sublayer) as the IMI.

When the video codec comprises both a learned intra-frame codec and a learned inter-frame codec:
- The OMI used for overfitting the intra-frame codec may include the previously encoded/decoded inter frame and/or the previously encoded/decoded intra frame (or features extracted therefrom). The IMI may include the currently encoded/decoded intra frame; or
- The OMI used for overfitting the inter-frame codec may include the previously encoded/decoded intra frame and/or the previously encoded/decoded inter frame (or features extracted therefrom). The IMI may include the currently encoded/decoded inter frame.

Different Data than Encoded/Decoded Data for Performing the Overfitting Operation In one alternative embodiment, instead of using the OMI, the encoder performs the overfitting operation by using data that may not be part of the content being encoded/decoded (e.g., the video). This data may be referred to as xOMI (e.g., for external OMI). Examples of the xOMI may be one of the following:
- A data item, such as a small image, or a tensor, which may be available at encoder side. It may be already present at encoder side, or it may be synthesized during the overfitting operation. In this case, the encoder may encode the xOMI and provide it to the decoder. The decoder may first decode the xOMI and then use it within the overfitting operation; or
- An image, a video, or a data tensor which is available both at encoder side and decoder side, for example, as part of a dataset or collection of data items. In this case, the encoder may signal to the decoder information on how to retrieve the xOMI, such as, an index that identifies the xOMI within a collection of data items, or an URI. The decoder may first retrieve the xOMI and then use it within the overfitting operation.

Alternative Embodiment: Using a Different Context than Latest Context

In an alternative embodiment, the encoder may determine which data shall be used as context by the PM for outputting a probability estimate for a certain IMI. Information about the determined context data may then be signalled to the decoder side, together with information about the IMI that shall be decoded based on probability estimates that are output by the PM when its input is the determined context data. Both the encoder side PM and decoder side PM would then use the determined context data as input, to output a probability estimate for the indicated IMI.

In an alternative implementation, a recurrent neural network (RNN) may be used as the architecture for at least part of the PM. In this case, the PM would have an internal state (or hidden state). The internal state of such a PM may be saved at some of the inference operations of the PM, so that it can be referenced or used later. The encoder may determine which internal state shall be used by the PM for outputting a probability estimate for a certain IMI. Information about the determined internal state may then be signalled to the decoder side, together with information about the IMI that shall be decoded based on probability estimates that are output by the PM that uses the determined internal state.

Experimental Results

Various embodiment were tested on 5 test videos and in two different setups. The baseline is a system where the probability model is not overfitted.

The first setup comprises an end-to-end learned intra-frame codec. The OMI is the previously encoded intra frame. The IMI is the current intra frame. The base PM was a default pretrained PM. Performance is measured by the negative of loss value, as indicated in Table 1 below. Higher value indicates better results/performance.

TABLE 1

| Videos | Video 1 | Video 2 | Video 3 | Video 4 | Video 5 |
| --- | --- | --- | --- | --- | --- |
| Baseline | 0.990289 | 0.950778 | 0.979892 | 0.946681 | 0.982043 |
| Proposed embodiments | 0.991794 | 0.953948 | 0.981250 | 0.948226 | 0.982950 |

The second setup comprises an end-to-end learned inter-frame codec. The OMI is the previously encoded inter frame. The IMI is the current inter frame. The base PM was a default pretrained PM. Performance is measured by the negative of loss value, a indicated in Table 2 below. Higher value indicates better results/performance.

TABLE 2

| Videos | Video 1 | Video 2 | Video 3 | Video 4 | Video 5 |
| --- | --- | --- | --- | --- | --- |
| Baseline | 0.994981 | 0.976205 | 0.988626 | 0.950059 | 0.954581 |
| Proposed embodiments | 0.994989 | 0.976795 | 0.988708 | 0.950640 | 0.954990 |

For both setups, the score is higher for the proposed method as compared with the baseline.

FIG. 15 is an example apparatus 1500, which may be implemented in hardware, configured to implement mechanisms for probability model overfitting, based on the examples described herein. The apparatus 1500 comprises at least one processor 1502, at least one non-transitory memory 1504 including computer program code 1505, wherein the at least one memory 1504 and the computer program code 1505 are configured to, with the at least one processor 1502, cause the apparatus 1500 to implement mechanisms for probability model overfitting 1506, based on the examples described herein. In an embodiment, the at least one neural network or the portion of the at least one neural network may be used at a decoder-side for decoding or reconstructing one or more media items.

The apparatus 1500 optionally includes a display 1508 that may be used to display content during rendering. The apparatus 1500 optionally includes one or more network (NW) interfaces (I/F(s)) 1510. The NW I/F(s) 1510 may be wired and/or wireless and communicate over the Internet/other network(s) via any communication technique. The NW I/F(s) 1510 may comprise one or more transmitters and one or more receivers. The N/W I/F(s) 1510 may comprise standard well-known components such as an amplifier, filter, frequency-converter, (de)modulator, and encoder/decoder circuitry(ies) and one or more antennas.

The apparatus 1500 may be a remote, virtual or cloud apparatus. The apparatus 1500 may be either a coder or a decoder, or both a coder and a decoder. The at least one memory 1504 may be implemented using any suitable data storage technology, such as semiconductor based memory devices, flash memory, magnetic memory devices and systems, optical memory devices and systems, fixed memory and removable memory. The at least one memory 1504 may comprise a database for storing data. The apparatus 1500 need not comprise each of the features mentioned, or may comprise other features as well. The apparatus 1500 may correspond to or be another embodiment of the apparatus 50 shown in FIG. 1 and FIG. 2, or any of the apparatuses shown in FIG. 3. The apparatus 1500 may correspond to or be another embodiment of the apparatuses shown in FIG. 18, including UE 110, RAN node 170, or network element(s) 190.

FIG. 16 illustrates an example method 1600 for probability model overfitting, in accordance with an embodiment. As shown in block 1506 of FIG. 15, the apparatus 1500 includes means, such as the processing circuitry 1502 or the like, for implementing mechanisms for probability model overfitting. At 1602, the method 1600 includes performing an overfitting operation, at an encoder side, to obtain an overfitted probability model. The overfitting comprises one or more training operations applied to a probability model, where one or more parameters of the probability model are trained. At 1604, the method 1600 includes using the overfitted probability model to provide probability estimates to a lossless codec or a substantially lossless codec for encoding data or a portion of the data. At 1606, the method 1600 includes signaling information to a decoder on whether to perform the overfitting operation at the decoder side.

Figure 17:
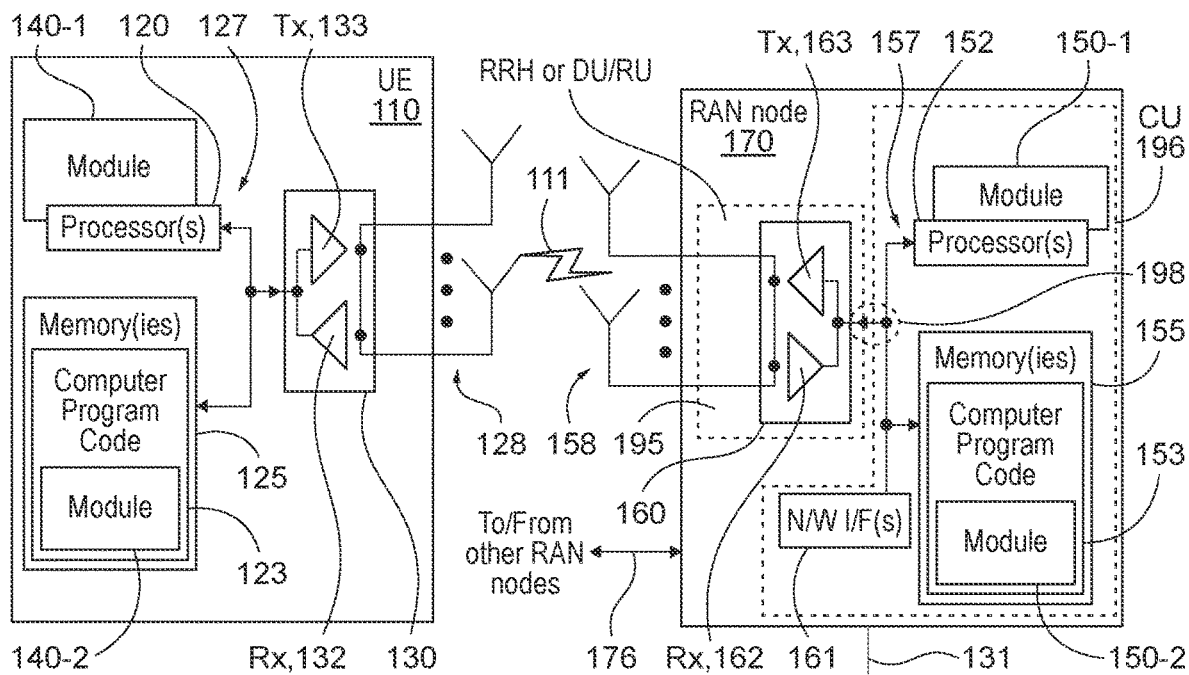
FIG. 17 illustrates an example method for probability model overfitting, in accordance with another embodiment.

FIG. 17 illustrates an example method 1700 for probability model overfitting, in accordance with another embodiment. As shown in block 1506 of FIG. 15, the apparatus 1500 includes means, such as the processing circuitry 1502 or the like, for implementing mechanisms for probability model overfitting. At 702, the method 1700 includes receiving a signal comprising information for indicating whether to perform an overfitting operation at the decoder side. At 1704, the method 1700 includes performing the overfitting operation, based on the signal received, to obtain an overfitted probability model. The overfitting comprises one or more training operations applied to a probability model, where one or more parameters of the probability model are trained. At 1706, the method 1700 includes using the overfitted probability model to provide probability estimates to a lossless codec or a substantially lossless codec for decoding data or a portion of the data.

Figure 18:
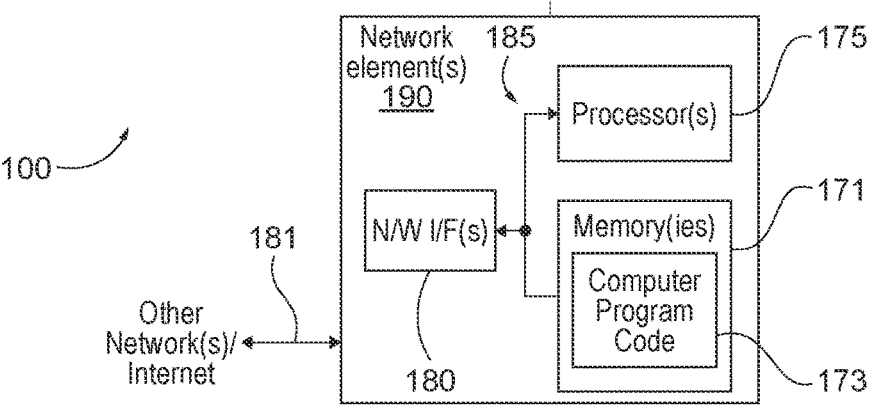
FIG. 18 is a block diagram of one possible and non-limiting system in which the example embodiments may be practiced.

Referring to FIG. 18, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement mechanisms for probability model overfitting. Computer program code 173 may also be configured to implement mechanisms probability model overfitting.

As described above, FIGS. 16 and 17 include a flowcharts of an apparatus (e.g. 50, 100, 602, 604, 700, or 1500), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 704, or 1504) of an apparatus employing an embodiment of the present invention and executed by processing circuitry (e.g. 56, 120, 702, or 1502,) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 16 and 17. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with reference to an SEI message or an SEI NAL unit. It needs to be understood, however, that embodiments can be similarly realized with any similar structures or data units. Where example embodiments have been described with SEI messages contained in a structure, any independently parsable structures could likewise be used in embodiments. Specific SEI NAL unit and a SEI message syntax structures have been presented in example embodiments, but it needs to be understood that embodiments generally apply to any syntax structures with a similar intent as SEI NAL units and/or SEI messages.

In the above, some embodiments have been described in relation to a particular type of a parameter set (namely adaptation parameter set). It needs to be understood, however, that embodiments could be realized with any type of parameter set or other syntax structure in the bitstream.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

What is claimed is:

1. An apparatus comprising
at least one processor; and
at least one memory storing instructions that, when executed by the at least one processor, cause the apparatus at least to:
performing, at an encoder, first overfitting of a probability model by performing at least one or more training operations applied to the probability model to obtain an overfitted probability model, wherein one or more parameters of the probability model are trained via the first overfitting;
using, at the encoder, the overfitted probability model to provide probability estimates to a lossless codec or a substantially lossless codec for encoding data;
outputting the encoded data to become part of a bitstream; and
signaling, by the encoder in the bitstream, information to a decoder to perform a second overfitting of a probability model used at the decoder.

2. The apparatus of claim 1, wherein an input data is used to overfit the probability model at the encoder, and wherein the input data is sampled from or comprised in data that was previously encoded by the lossless codec or the substantially lossless codec.

3. The apparatus of claim 2, wherein the input data comprises one or more of the following:
one or more previously encoded frames;
one or more pixels of a previously encoded frame;
one or more pixels of a currently encoded frame;
one or more pixels that have been encoded in past predetermined time, wherein the one or more pixels are part of a frame;
one or more previously encoded latent tensors or feature tensors;
one or more elements of a previously encoded latent tensor or feature tensor;
one or more elements of a currently encoded latent tensor or feature tensor; or
one or more elements that have been encoded in past predetermined time, wherein the one or more elements are part of a latent tensor or a feature tensor.

4. The apparatus of claim 2, wherein-the-data, from which the input data is sampled or comprised in, comprises an overfitting media item, and wherein the overfitting media item comprises previously encoded data, and wherein the previously encoded data comprises one or more of following:

a portion of a frame of video, or features extracted from the frame;

a downsampled version of the frame, or features extracted from the downsampled version of the frame;

a set of portions of the frame, or features extracted from the set of the portions of the frame;

a set of portions of a set of frames, or features extracted from the set of the portions of the set of the frames;

the frame of the video, or features extracted from the frame of the video;

a set of frames of the video or features extracted from the set of the frames of the video; or a set of videos, or features extracted from the set of the videos.

5. The apparatus of claim 1, wherein the apparatus is further caused to use the overfitted probability model at the encoder or a previously available probability model at the encoder to encode data that follow an overfitted media item or a portion of the data that follows the overfitted media item in decoding order, wherein data that follow the overfitted media item or a portion of the data that follows the overfitted media item comprises an inference media item.

6. The apparatus of claim 1, wherein the information signaled to the decoder further comprises details about one or more of the following:

a version of the probability model to be used when the second overfitting is not to be performed;

a version of the probability model to be used as a base probability model for performing the second overfitting;

an overfitting media item to be used for performing the second overfitting, wherein the information further comprises a type of the overfitting media item and coordinates to uniquely identify a specific overfitting media item as the overfitting media item;

data to be decoded by using the probability model referred in the signal; or training, wherein the training is part of the second overfitting, and wherein details about the training comprise a number of epochs or iterations, a learning rate, an optimizer routine, a loss function, a loss function schedule, a data preprocessing information, any seeds for pseudo-random processes, or any other information which is needed by the decoder to perform the second overfitting in same or substantially a same way as performed by the encoder.

7. An apparatus comprising
at least one processor; and
at least one memory storing instructions that, when executed by the at least one processor, cause the apparatus at least to:

receiving, from a bitstream at a decoder from an encoder, encoded data;

receiving, in the bitstream, a signal comprising information for indicating to perform an overfitting of a probability model at the decoder;

performing, based on the signal received, the overfitting of the probability model at the decoder by performing one or more training operations applied to the probability model to obtain an overfitted probability model, wherein one or more parameters of the probability model are trained via the overfitting;

using, at the decoder, the overfitted probability model to provide probability estimates to a lossless codec or a substantially lossless codec for decoding the encoded data to form decoded data; and outputting the decoded data.

8. The apparatus of claim 7, wherein the information further comprises details about one or more of the following:

a version of the probability model to be used when the overfitting is not be performed;

a version of the probability model to be used as a base probability model for performing the overfitting;

an overfitting media item to be used for performing the overfitting, wherein the information further comprises a type of overfitting media item and coordinates to uniquely identify a specific overfitting media item;

data to be decoded by using the probability model referred in the signal; or training, wherein the training is part of the overfitting, and wherein details about the training comprise a number of epochs or iterations, a learning rate, an optimizer routine, a loss function, a loss function schedule, a data preprocessing information, any seeds for pseudo-random processes, or any other information which is needed by the decoder to perform the overfitting in a same or substantially a same way as performed by the encoder.

9. The apparatus of claim 7, wherein an input data is used to overfit the probability model, and wherein the input data is sampled from or comprised in data that was previously decoded by the lossless codec or the substantially lossless codec.

10. The apparatus of claim 9, wherein the input data comprises one or more of the following:

one or more previously decoded frames;

one or more pixels of a previously decoded frame;

one or more pixels of a currently decoded frame;

one or more pixels that have been decoded in past predetermined time, wherein the one or more pixels are part of a frame;

one or more previously decoded latent tensors or feature tensors;

one or more elements of a previously decoded latent tensor or feature tensor;

one or more elements of a currently decoded latent tensor or feature tensor; or one or more elements that have been decoded in past predetermined time, wherein the one or more elements are part of a latent tensor or a feature tensor.

11. The apparatus of claim 9, wherein data, from which the input data is sampled or comprised in, comprises an overfitting media item, and wherein the overfitting media item comprises previously decoded data, and wherein the previously decoded data comprises one or more of following:

a portion of a frame of video, or features extracted from the frame;

a downsampled version of the frame, or features extracted from the downsampled version of the frame;

a set of portions of the frame, or features extracted from the set of the portions of the frame;

a set of portions of a set of frames, or features extracted from the set of portions of the set of the frames;

the frame of the video, or features extracted from the frame of the video;

a set of frames of the video or features extracted from the set of the frames of the video; or a set of videos, or features extracted from the set of the videos.

12. The apparatus of claim 7, wherein the apparatus is further caused to use the overfitted probability model or previously available probability model to decode data that follow an overfitted media item or a portion of the data that follows the overfitted media item in decoding order, wherein data that follow the overfitted media item or a portion of the data that follows the overfitted media item comprises an inference media item.

13. A method comprising:
performing, at an encoder, first overfitting of a probability model by performing at least one or more training operations applied to the probability model, wherein one or more parameters of the probability model are trained via the first overfitting;
using, at the encoder, the probability model overfit at the encoder to provide probability estimates to a lossless codec or a substantially lossless codec for encoding data;
outputting the encoded data to become part of a bitstream; and
signaling, by the encoder in the bitstream, information to a decoder to perform a second overfitting of a probability model used at the decoder.

14. The method of claim 13, wherein an input data is used to overfit the probability model at the encoder, and wherein the input data is sampled from or comprised in data that was previously encoded by the lossless codec or the substantially lossless codec.

15. The method of claim 14, wherein the input data comprises one or more of the following:
one or more previously encoded frames;
one or more pixels of a previously encoded frame;
one or more pixels of a currently encoded frame;
one or more pixels that have been encoded in past predetermined time, wherein the one or more pixels are part of a frame;
one or more previously encoded latent tensors or feature tensors;
one or more elements of a previously encoded latent tensor or feature tensor;
one or more elements of a currently encoded latent tensor or feature tensor; or
one or more elements that have been encoded in past predetermined time, wherein the one or more elements are part of a latent tensor or a feature tensor.

16. The method of claim 14, wherein data, from which the input data is sampled or comprised in, comprises an overfitting media item, and wherein the overfitting media item comprises previously encoded data, and wherein the previously encoded data comprises one or more of following:
a portion of a frame of video, or features extracted from the frame;
a downsampled version of the frame, or features extracted from the downsampled version of the frame;
a set of portions of the frame, or features extracted from the set of the portions of the frame;
a set of portions of a set of frames, or features extracted from the set of the portions of the set of the frames;
the frame of the video, or features extracted from the frame of the video;
a set of frames of the video or features extracted from the set of the frames of the video; or
a set of videos, or features extracted from the set of the videos.

17. The method of claim 13, further comprising using the probability model overfit at the encoder or previously available probability model at the encoder to encode data that follow an overfitted media item or a portion of the data that follows the overfitted media item in decoding order, wherein data that follow the overfitted media item or a portion of the data that follows the overfitted media item comprises an inference media item.

18. The method of claim 13, wherein the information signaled to the decoder further comprises details about one or more of the following:
a version of the probability model to be used when the second overfitting is not to be performed;
a version of the probability model to be used as a base probability model for performing the second overfitting;
an overfitting media item to be used for performing the second overfitting, wherein the information further comprises a type of the overfitting media item and coordinates to uniquely identify a specific overfitting media item as the overfitting media item;
data to be decoded by using the probability model referred in the information signaled to the decoder; or
training, wherein the training is part of the second overfitting, and wherein details about the training comprise a number of epochs or iterations, a learning rate, an optimizer routine, a loss function, a loss function schedule, a data preprocessing information, any seeds for pseudo-random processes, or any other information which is needed by the decoder to perform the second overfitting in same or substantially same way as performed by the encoder.

19. A method comprising:
receiving, from a bitstream at a decoder from an encoder, encoded data;
receiving, in the bitstream, a signal comprising information for indicating to perform overfitting of a probability model at the decoder;
performing, based on the signal received, the overfitting of the probability model at the decoder to obtain an overfitted probability model, wherein one or more parameters of the probability model are trained via the overfitting; and
using, at the decoder, the overfitted probability model to provide probability estimates to a lossless codec or a substantially lossless codec for decoding the encoded data or to form decoded data and
outputting the decoded data.

20. The method of claim 19, wherein the information further comprises details about one or more of the following:
a version of the probability model to be used when the overfitting is not to be performed;
a version of the probability model to be used as a base probability model for performing the overfitting;
an overfitting media item to be used for performing the overfitting, wherein the information further comprises a type of overfitting media item and coordinates to uniquely identify a specific overfitting media item;
data to be decoded by using the probability model referred in the signal; or
training, wherein the training is part of the overfitting, and wherein details about the training comprise a number of epochs or iterations, a learning rate, an optimizer routine, a loss function, a loss function schedule, a data preprocessing information, any seeds for pseudo-random processes, or any other information which is needed by the decoder to perform the overfitting in same or substantially same way as performed by the encoder.

21. The method of claim 19, wherein an input data is used to overfit the probability model, and wherein the input data is sampled from or comprised in data that was previously decoded by the lossless codec or the substantially lossless codec.

22. The method of claim 21, wherein the input data comprises one or more of the following:
one or more previously decoded frames;
one or more pixels of a previously decoded frame;
one or more pixels of a currently decoded frame;
one or more pixels that have been decoded in past predetermined time, wherein the one or more pixels are part of a frame;
one or more previously decoded latent tensors or feature tensors;
one or more elements of a previously decoded latent tensor or feature tensor;
one or more elements of a currently decoded latent tensor or feature tensor; or
one or more elements that have been decoded in past predetermined time, wherein the one or more elements are part of a latent tensor or a feature tensor.

23. The method of claim 21, wherein data, from which the input data is sampled or comprised in, comprises an overfitting media item, and wherein the overfitting media item comprises previously decoded data, and wherein the previously decoded data comprises one or more of following:
a portion of a frame of video, or features extracted from the frame;
a downsampled version of the frame, or features extracted from the downsampled version of the frame;
a set of portions of the frame, or features extracted from the set of the portions of the frame;
a set of portions of a set of frames, or features extracted from the set of the portions of the set of the frames;
the frame of the video, or features extracted from the frame of the video;
a set of frames of the video or features extracted from the set of the frames of the video;
or
a set of videos, or features extracted from the set of the videos.

24. The method of claim 19 further comprising using the overfitted probability model or previously available probability model to decode data that follow an overfitted media item or a portion of the data that follows the overfitted media item in decoding order, wherein data that follow the overfitted media item or a portion of the data that follows the overfitted media item comprises an inference media item.

* * * * *